United States Patent
Iwai et al.

(10) Patent No.: US 11,606,825 B2
(45) Date of Patent: Mar. 14, 2023

(54) RADIO BASE STATION, EDGE SERVER, AND METHODS THEREIN

(71) Applicant: NEC Corporation, Tokyo (JP)

(72) Inventors: Takanori Iwai, Tokyo (JP); Daisuke Mizukami, Tokyo (JP); Hisashi Futaki, Tokyo (JP); Sadafuku Hayashi, Tokyo (JP); Hajime Zembutsu, Tokyo (JP); Yoshinori Watanabe, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 16/943,735

(22) Filed: Jul. 30, 2020

(65) Prior Publication Data
US 2020/0359433 A1 Nov. 12, 2020

Related U.S. Application Data

(63) Continuation of application No. 15/775,537, filed as application No. PCT/JP2016/086509 on Dec. 8, 2016, now Pat. No. 10,764,945.

(30) Foreign Application Priority Data

Dec. 11, 2015 (JP) .................. 2015-242686

(51) Int. Cl.
*H04W 76/11* (2018.01)
*H04W 88/18* (2009.01)
(Continued)

(52) U.S. Cl.
CPC ........... *H04W 76/11* (2018.02); *H04L 47/825* (2013.01); *H04W 8/28* (2013.01); *H04W 76/12* (2018.02);
(Continued)

(58) Field of Classification Search
CPC .................................................... H04W 76/11
See application file for complete search history.

(56) References Cited

U.S. PATENT DOCUMENTS

2007/0123277 A1 5/2007 Harris et al.
2015/0124622 A1\* 5/2015 Kovvali ................ H04L 47/125
370/236
(Continued)

FOREIGN PATENT DOCUMENTS

JP 2007-534212 A 11/2007
JP 2008-512880 A 4/2008
(Continued)

OTHER PUBLICATIONS

International Search Report corresponding to PCT/JP2016/086509 dated Feb. 7, 2017 (3 pages).
(Continued)

*Primary Examiner* — Jason E Mattis

(57) ABSTRACT

A RAN node (2) receives, from a core network node (6, 7, 8), a first identifier that is used by a service, an application, or an edge server (5) to identify a radio terminal (1) connected to the RAN node (2), and associates the first identifier with a second identifier that is used by the RAN node (2) to identify the radio terminal (1). Further, the RAN node (2) communicates with the edge server (5) using the first identifier. It is thus, for example, possible to allow an MEC server (or an MEC application hosted on the MEC server) and a radio access network (RAN) node to directly exchange therebetween a control message regarding a specific radio terminal.

9 Claims, 17 Drawing Sheets

(51) Int. Cl.
- *H04W 88/08* (2009.01)
- *H04W 76/12* (2018.01)
- *H04L 47/70* (2022.01)
- *H04W 8/28* (2009.01)
- *H04W 8/26* (2009.01)
- *H04W 36/08* (2009.01)

(52) U.S. Cl.
CPC ........... *H04W 88/08* (2013.01); *H04W 88/18* (2013.01); *H04W 8/26* (2013.01); *H04W 36/08* (2013.01); *H04W 88/182* (2013.01)

(56) References Cited

U.S. PATENT DOCUMENTS

| | | | |
|---|---|---|---|
| 2015/0351140 A1* | 12/2015 | Sonnevi | H04W 8/082 370/329 |
| 2016/0234760 A1* | 8/2016 | Orlandi | H04W 48/14 |
| 2017/0048876 A1* | 2/2017 | Mahindra | H04L 12/407 |
| 2017/0094700 A1 | 3/2017 | Hong et al. | |
| 2017/0373953 A1 | 12/2017 | George et al. | |
| 2018/0176039 A1 | 6/2018 | Shi et al. | |
| 2018/0184323 A1* | 6/2018 | Xiong | H04W 84/045 |
| 2018/0295098 A1 | 10/2018 | Yuzawa | |

FOREIGN PATENT DOCUMENTS

| | | |
|---|---|---|
| JP | 2015-528666 A | 9/2015 |
| WO | WO-2005/036902 A2 | 4/2005 |
| WO | 2015/105183 A1 | 7/2015 |
| WO | 2015/170764 A1 | 11/2015 |

OTHER PUBLICATIONS

Yun Chao Hu, Milan Patel, Dario Sabella, Nurit Sprecher, and Valerie Young, ETSI White Paper No. 11 "Mobile Edge Computing a key technology towards 5G" First edition, the European Telecommunications Standards Institute, Sep. 2015 (pp. 1-16).

ETSI GS MEC-IEG 004 V1.1.1 (Nov. 2015) "Mobile-Edge Computing (MEC); Service Scenarios", the European Telecommunications Standards Institute, Nov. 2015 (pp. 1-16).

Ryutaro Kawamura, Road to 2020 Dai 4 Kai 5G No. Subete, Nikkei Communications, No. 622, Nov. 1, 2015 (Nov. 1, 2015), pp. 52 to 58 (9 pages).

NEC, 5G RAN Architecture & Radio Technologies, Time Plan, 3GPP RAN workshop on 5G RWS-150018, Sep. 3, 2015 (pp. 1-12).

Japanese Office Action for JP Application No. 2021-018066 dated Apr. 12, 2022 with English Translation.

* cited by examiner

Fig. 12

MEC SERVER, APPLICATION, SERVICE — 5

UE IP ADDRESS

COMMUNICATION USING "UE IP ADDRESS" FOR IDENTIFYING UE
1203

HeNB-GW — 10 eNB UE S1AP ID
MME UE S1AP ID
*UE IP ADDRESS*
1202

MME — 6

IMSI
GUTI
UE IP ADDRESS
eNB UE S1AP ID
MME UE S1AP ID

S1 eNB TEID
S1 S-GW TEID

UE IP ADDRESS
1201

RADIO BASE STATION, EDGE SERVER, AND METHODS THEREIN

The present application is a continuation of U.S. patent application Ser. No. 15/775,537, filed May 11, 2018, entitled "RADIO BASE STATION, EDGE SERVER, AND METHODS THEREIN," which is a national stage application of International Application No. PCT/JP2016/086509 entitled "Radio Base Station, Edge Server, and Methods Thereof" filed on Dec. 8, 2016, which claims priority to Japanese Patent Application No. 2015-242686 filed on Dec. 11, 2015, the disclosures of which are hereby incorporated by reference in their entirety.

TECHNICAL FIELD

The present disclosure relates to a mobile communication network, and in particular, to an apparatus and a method for mobile edge computing.

BACKGROUND ART

The European Telecommunications Standards Institute (ETSI) has started standardization of Mobile Edge Computing (MEC) (see Non-Patent Literature 1 and 2). The MEC offers, to application developers and content providers, cloud-computing capabilities and an information technology (IT) service environment in the Radio Access Network (RAN) in close proximity to mobile subscribers. This environment provides ultra-low latency and high bandwidth as well as direct access to radio network information (subscriber's location, cell load etc.) that can be leveraged by applications and services.

The MEC server is integrally arranged with a RAN node. Specifically, the MEC server can be deployed at any one of the following sites: at a Long Term Evolution (LTE) base station (eNodeB) site, a 3G Radio Network Controller (RNC) site, and at a multi-technology cell aggregation site. The multi-technology cell aggregation site can be located indoors within an enterprise (e.g., a hospital, a large corporate headquarters), or indoors/outdoors in a public building or arena (e.g., a shopping mall, a stadium) to control a large number of local, multi-technology access points.

The MEC server provides applications (MEC applications) with computing resources, storage capacity, connectivity, and access to user traffic and radio network information. More specifically, the MEC server provides a hosting environment for applications by providing Infrastructure as a Service (IaaS) facilities or Platform as a Service (PaaS) facilities.

MEC is based on a virtualized platform, similar to Network Function Virtualization (NFV). While NFV focuses on network functions, MEC enables applications to be run at the edge of the network. The infrastructure that hosts MEC is quite similar to the infrastructure that hosts NFV or network functions. Accordingly, it is beneficial to reuse the infrastructure and infrastructure management of NFV for MEC by hosting both Virtual Network Functions (VNFs) and MEC applications on the same platform.

CITATION LIST

Non-Patent Literature

[Non-Patent Literature 1] Yun Chao Hu, Milan Patel, Dario Sabella, Nurit Sprecher, and Valerie Young, ETSI White Paper No. 11 "Mobile Edge Computing A key technology toward 5G" First edition, the European Telecommunications Standards Institute, September 2015

[Non-Patent Literature 2] ETSI GS MEC-IEG 004 V1.1.1 (2015-11) "Mobile-Edge Computing (MEC); Service Scenarios", the European Telecommunications Standards Institute, November 2015

SUMMARY OF INVENTION

Technical Problem

The inventors have found several problems regarding MEC, in particular, problems regarding identification of radio terminals. As described above, MEC is expected to contribute to reduction of delay in applications and services directed to radio terminals, thereby contributing to improving QoE of users. However, in a situation in which, for example, a large number of radio terminals are connected to the RAN, the RAN may not be able to satisfy the delay requirements required by radio terminals that use or relate to MEC. If the MEC server is able to request a RAN node (e.g., a radio base station (eNodeB/RNC)) for a special treatment given to specific radio terminals that use or relate to MEC with regard to radio resource management (RRM), scheduling or the like in the RAN, it may be beneficial to solve this problem.

However, it should be mentioned here that a terminal identifier(s) to be used by the MEC server, or the MEC applications hosted on the MEC server, to identify a radio terminal is different from a terminal identifier(s) to be used by the RAN node (e.g., radio base station) to identify the radio terminal. In other words, there is no common terminal identifier that both the MEC server (or MEC applications hosted on the MEC server) and the RAN node use. It is thus difficult for the MEC server to directly send a control or request message regarding a specific radio terminal to the RAN node.

Specifically, the MEC server and the MEC applications hosted thereon can use an Internet Protocol (IP) address or application layer ID (or name) of a radio terminal to identify the radio terminal. Meanwhile, to identify a radio terminal connected to a RAN node (e.g., radio base station), the RAN node uses identifiers such as a terminal identifier in the RAN (or an Access Stratum (AS)), a terminal identifier on a control connection between the RAN node and the core network, and a bearer (or session) identifier for a data bearer between the RAN node and the core network. For example, a LTE radio base station (i.e., eNB) uses a Cell Radio Network Temporary Identifier (C-RNTI), an eNB UE S1AP ID, an S eNB Tunnel Endpoint Identifier (TEID), and the like, to uniquely identify a radio terminal (i.e., UE).

One of the objects to be attained by embodiments disclosed herein is to provide an apparatus, a method, and a program that contribute to allowing an MEC server (or an MEC applications hosted on the MEC server) and a RAN node to directly exchange therebetween control messages regarding a specific radio terminal.

Solution to Problem

In a first aspect, a radio access network node includes a communication module. The communication module is configured to communicate with an edge server that provides at least one of computing resources and storage resources for edge computing regarding a service or application directed to a radio terminal connected to the radio access network. The communication module is configured to receive from a core network node a first identifier that is used by the service, the application, or the edge server to identify the radio terminal. The communication module is configured to associate the first identifier with a second identifier that is used by the radio access network node to identify the radio terminal. Further, the communication module is configured to communicate with the edge server using the first identifier.

In a second aspect, a method in a radio access network node arranged in a radio access network includes:
(a) receiving from a core network node a first identifier that is used by a service, an application, or an edge server to identify a radio terminal connected to the radio access network, the edge server providing at least one of computing resources and storage resources for edge computing regarding the service or the application directed to the radio terminal;
(b) associating the first identifier with a second identifier that is used by the radio access network node to identify the radio terminal; and
(c) communicating with the edge server using the first identifier.

In a third aspect, an edge server includes an edge computing platform and a communication module. The edge computing platform is configured to provide at least one of computing resources and storage resources for edge computing regarding a service or application directed to a radio terminal connected to a radio access network. The communication module is configured to receive from a core network node a first identifier that is used by the radio access network node to identify the radio terminal. The communication module is configured to associate the first identifier with a second identifier that is used by the service, the application, or the edge server to identify the radio terminal. Further, the communication module is configured to communicate with the radio access network node using the first identifier.

In a fourth aspect, a method in an edge server includes:
(a) receiving from a core network node a first identifier that is used by a radio access network node to identify a radio terminal connected to a radio access network;
(b) associating the first identifier with a second identifier that is used by a service, an application, or the edge server to identify the radio terminal; and
(c) communicating with the radio access network node using the first identifier.

In a fifth aspect, a program includes instructions (software codes) that, when loaded into a computer, cause the computer to perform the method according to the second or fourth aspect.

Advantageous Effects of Invention

According to the above-described aspects, it is possible to provide an apparatus, a method, and a program capable of contributing to allowing an MEC server (or an MEC application hosted on the MEC server) and a RAN node to directly exchange therebetween control messages regarding a specific radio terminal.

BRIEF DESCRIPTION OF DRAWINGS

FIG. 12 is a diagram showing one example of operations of the HeNB-GW, the MEC server, and an MME according to the ninth embodiment;

DESCRIPTION OF EMBODIMENTS

Specific embodiments are described hereinafter in detail with reference to the drawings. The same or corresponding elements are denoted by the same reference signs throughout the drawings, and repetitive descriptions will be avoided as necessary for clarity of explanation.

The following descriptions on the embodiments mainly focus on LTE and LTE-Advanced. However, these embodiments are not limited to being applied to LTE and LTE-Advanced and may be applied to other mobile communication networks or systems such as a 3rd Generation Partnership Project (3GPP) Universal Mobile Telecommunications System (UMTS), a 3GPP2 CDMA2000 system, a Global System for Mobile communications (GSM (Registered Trademark))/General packet radio service (GPRS) system, a WiMAX system, and a mobile WiMAX system.

First Embodiment

Figure 1:
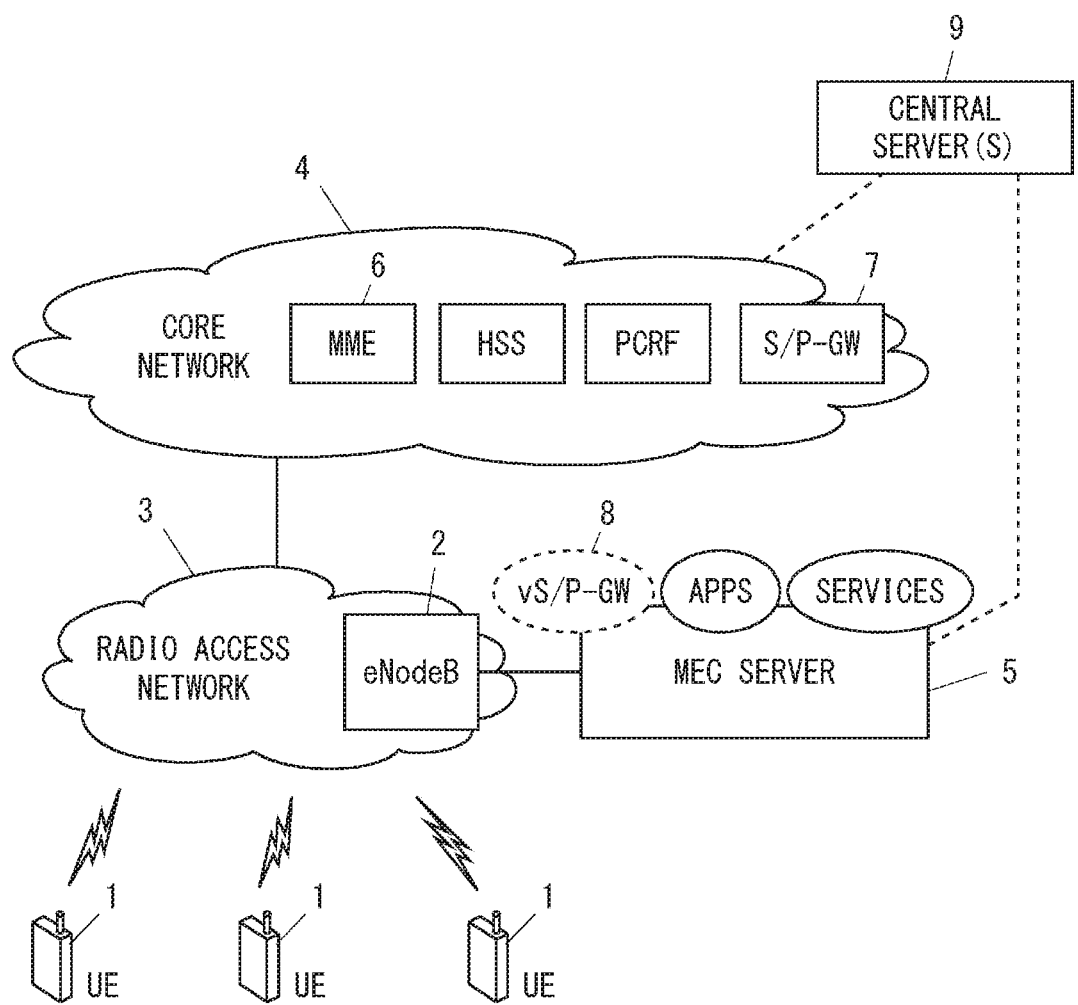
FIG. 1 is a diagram showing a configuration example of a mobile communication network according to several embodiments.

FIG. 1 shows a configuration example of a mobile communication network according to several embodiments including this embodiment. In the example shown in FIG. 1, the mobile communication network includes a RAN 3 (i.e., Evolved UMTS Terrestrial Radio Access Network (E-UTRAN)) and a core network 4 (i.e., Evolved Packet Core (EPC)). The RAN 3 includes an eNodeB 2. The eNodeB 2, which is arranged in the RAN 3, is configured to communicate with a plurality of radio terminals 1 (i.e., User Equipments (UEs)) connected to the RAN 3 and provide radio resource management for these UEs 1. For example, the radio resource management includes: establishment, modification, and release of a radio connection (e.g., Radio Resource Control (RRC) connection) with each UE 1; scheduling of radio resources for each UE 1; configuration of Dedicated Scheduling Request (D-SR) resources for each UE 1; and controlling of a handover of each UE 1. The eNodeB 2 shown in FIG. 1 may be a macro cell base station or a femto cell base station.

The eNodeB 2 shown in FIG. 1 may be a Baseband Unit (BBU) used in the Centralized Radio Access Network (C-RAN) architecture. In other words, the eNodeB 2 shown in FIG. 1 may be a RAN node connected to one or more Remote Radio Heads (RRHs). In some implementations, the eNodeB 2 serving as the BBU is connected to the EPC 4, and is responsible for control-plane processing including radio resource management and for digital baseband signal processing for the user plane. On the other hand, the RRH is responsible for analog Radio Frequency (RF) signal processing (e.g., frequency conversion and signal amplification). The C-RAN may also be referred to as a Cloud RAN. Further, the BBU may also be referred to as a Radio Equipment Controller (REC) or a Data Unit (DU). The RRH may also be referred to as a Radio Equipment (RE), a Radio Unit (RU), or a Remote Radio Unit (RRU).

Further, there is another C-RAN architecture in which a part of the baseband signal processing is arranged in the remote site. In some implementations, layer-1 (i.e., physical layer) baseband signal processing may be located in the remote site, and layer-2 (i.e., MAC sublayer, RLC sublayer, and PDCP sublayer) and layer-3 signal processing may be located in the central site. In some implementations, the layer-1 signal processing and a part or all of the layer-2 signal processing may be located in the remote site, and the layer-3 signal processing may be located in the central site. The eNodeB 2 shown in FIG. 1 may be a data unit located in the central site in these C-RAN architectures.

The core network 4 is a network mainly managed by an operator that provides mobile communication services. The core network 4 includes a plurality of user plane entities (e.g., a Serving Gateway (S-GW) and a Packet Data Network Gateway (P-GW)) and a plurality of control plane entities (e.g., a Mobility Management Entity (MME), a Home Subscriber Server (HSS), and a Policy and Charging Rule Function (PCRF)). The user plane entities including an S/P-GW 7 relay user data of the UEs 1 between the RAN 3 and an external network (i.e., Packet Data Network (PDN)). The control plane entities including an MME 6 perform various kinds of control for the UEs 1, such as mobility management, session management (or bearer management), subscriber information management, and billing management.

A Mobile Edge Computing (MEC) server 5 is arranged in the RAN 3 in such a way that it can directly communicate with a radio access network (RAN) node (that is, without traversing the core network 4). The MEC server 5 may also be referred to as an edge server. In the example shown in FIG. 1, the MEC server 5 is arranged in the RAN 3 in such a way that it can directly communicate with the eNodeB 2.

As described above, the eNodeB 2 may be a BBU. In some implementations, the MEC server 5 may be physically integrated with the eNodeB 2. In some implementations, the MEC server 5 may be installed in the same building (or site) as the eNodeB 2, and may be connected to the Local Area Network (LAN) in this site so that the MEC server 5 can communicate with the eNodeB 2.

The MEC server 5 is configured to provide at least one of computing resources and storage resources (or storage capacities) for edge computing regarding a service or application directed to one or more UEs 1. In some implementations, the MEC server 5 may provide a hosting environment for MEC applications by providing IaaS facilities or PaaS facilities.

The MEC server 5 may further include one or more of the functions of the core network 4. For example, the MEC server 5 may have the S-GW or S/P-GW function and terminate a bearer (e.g., Evolved Packet System (EPS) bearer) of the UE 1 that uses the MEC. As described above, the MEC architecture is similar to the NFV architecture. Accordingly, the MEC server 5 may host network functions including a virtualized S/P-GW (vS/P-GW) 8 as well as the MEC applications.

In some implementations, the MEC server 5 may communicate with one or more central servers 9. The MEC server 5 may communicate with the central server(s) 9 through the core network 4 or through a communication line (or a network) that does not traverse the core network 4.

Figure 2:
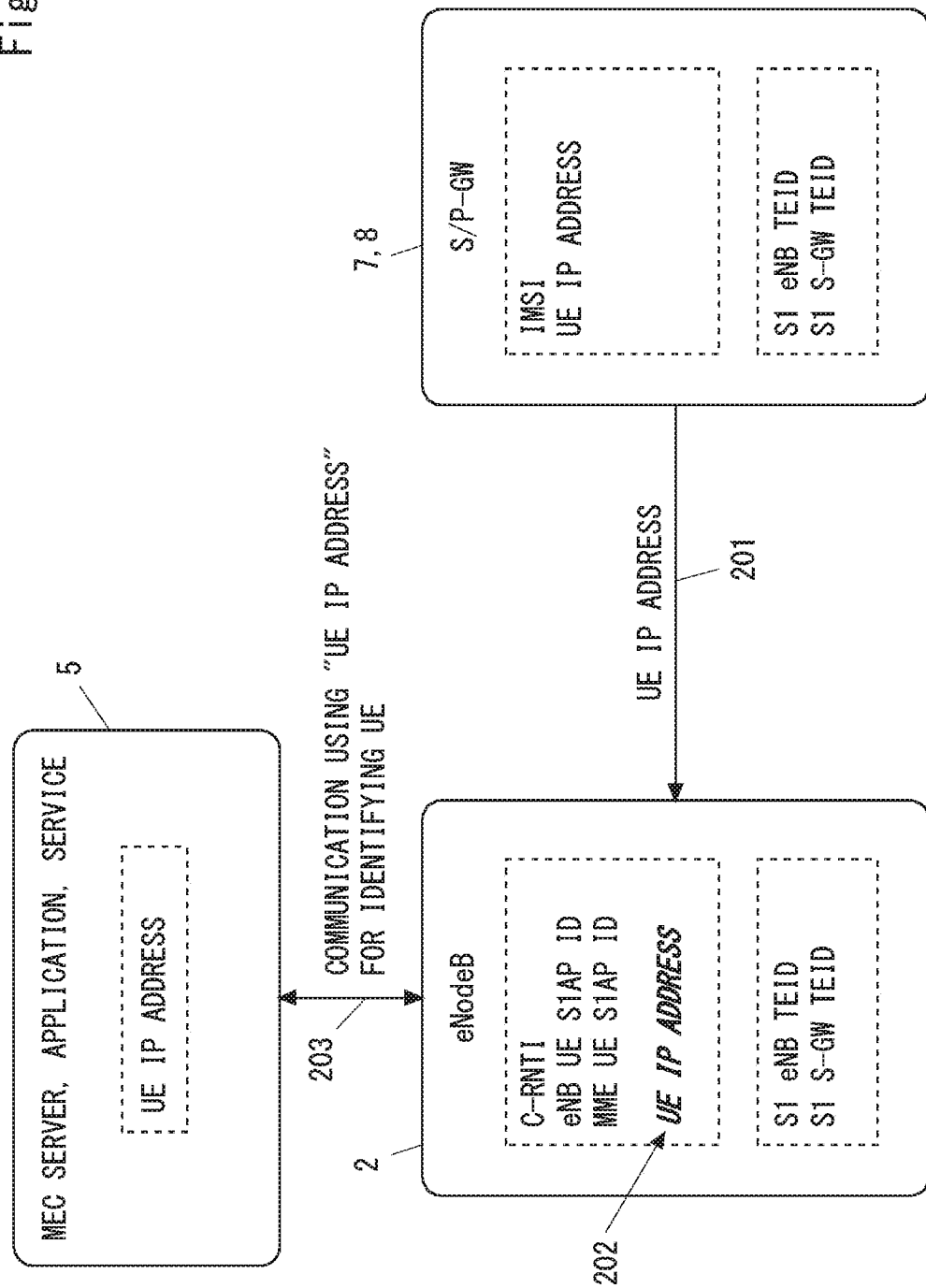
FIG. 2 is a diagram showing one example of operations of an eNodeB, an MEC server, and an S/P-GW according to a first embodiment.

The following descriptions, a procedure for allowing the eNodeB 2 and the MEC server 5 to use a common UE identifier will be described. FIG. 2 shows one example of operations of the eNodeB 2, the MEC server 5, and the S/P-GW 7 or 8. The S/P-GW 7 or 8 shown in FIG. 2 means the S-GW alone, the P-GW alone, or both the S-GW and the P-GW. The S/P-GW 7 or 8 may be the S/P-GW 7 arranged in the core network 4 or may be the S/P-GW 8 co-located in the location of the eNodeB 2 along with the MEC server 5. The S/P-GW 8 may be an S/P-GW virtualized on a platform that is the same as or differs from the MEC server 5.

In Step 201, the eNodeB 2 receives, from the S/P-GW 7 or 8, a first identifier that is used by the MEC server 5 or an application(s) (or service(s)) hosted on the MEC server 5 to identify the UE 1. The first identifier is used in the MEC server 5 or in applications (or services) hosted on the MEC server 5 to uniquely identify the UE 1. In the example shown in FIG. 2, the first identifier is a UE IP address (i.e., an IP address of the UE 1).

In some implementations, the eNodeB 2 may receive the first identifier through a user plane tunnel between the S-GW (the S/P-GW 7 or 8) and the eNodeB 2 (i.e., an S1 bearer). The S1 bearer is a GTP tunnel conforming to GTP for User Plane (GTP-U). The eNodeB 2 may acquire the first identifier from, for example, a Private Extension information element contained within a GTP-U signalling message received from the S-GW (the S/P-GW 7 or 8) through the S1 bearer.

In Step 202, the eNodeB 2 associates the first identifier, which has been received from the S/P-GW 7 or 8, with a second identifier that is used by the eNodeB 2 to identify the UE 1. In some implementations, the second identifier uniquely identifies the UE 1 in the eNodeB 2. In some implementations, the second identifier may uniquely identify the UE 1 in a cell provided by the eNodeB 2. In some implementations, the second identifier may uniquely identify the UE 1 on an interface (e.g., an S1-MME interface) between the eNodeB 2 and a control-plane core network node (e.g., the MME 6). In some implementations, the second identifier may uniquely identify the UE 1 or a bearer for the UE 1 on an interface (e.g., S1-U interface) between the eNodeB 2 and a user-plane core network node (e.g., the S/P-GW 7 or 8).

More specifically, the second identifier may be a C-RNTI, an eNB UE S1AP ID, an S eNB TEID, or any combination thereof. The second identifier may be a combination of these one or more identifiers and another identifier (e.g., an MME UE S1AP ID, S1 S-GW TEID). The C-RNTI is allocated by the eNodeB 2 and uniquely identifies the UE 1 in a cell provided by the eNodeB 2. The eNB UE S1AP ID is allocated by the eNodeB 2, uniquely identifies the UE 1 on an S-MME interface between the eNodeB 2 and the MME 6, and also uniquely identifies the UE 1 in the eNodeB 2. The MME UE S1AP ID is allocated by the MME 6, uniquely identifies the UE 1 on an S-MME interface between the eNodeB 2 and the MME 6, and also uniquely identifies the UE 1 in the MME 6. The S1 eNB TEID is allocated by the eNodeB 2, and identifies a downlink endpoint (i.e., the eNodeB 2 side) of an S1 bearer (i.e., a GTP tunnel) established between the eNodeB 2 and the S-GW (i.e., the S/P-GW 7 or 8). Since the S1 eNB TEID is unique in the eNodeB 2, the S1 eNB TEID is therefore able to identify the UE 1 that uses the S1 bearer uniquely in the eNodeB 2. The S1 S-GW TEID is allocated by the S-GW, and identifies an uplink endpoint (i.e., the S-GW side) of an S1 bearer (i.e., a GTP tunnel) established between the eNodeB 2 and the S-GW (i.e., the S/P-GW 7 or 8). Since the S1 S-GW TEID is unique in the S-GW, the S1 S-GW TEID is therefore able to identify the UE 1 that uses the S1 bearer uniquely in the S-GW (the S/P-GW 7 or 8).

The second identifier may include an MME UE S1AP ID, or a combination of an MME UE S1AP ID and an identifier of the MME (e.g., an MME Code (MMEC), an MME Identifier (MMEI), or a Globally Unique MMEI (GUMMEI)). For example, in an arrangement in which the eNodeB 2 is connected to only one MME 6, the MME UE S1AP ID can be used to uniquely identify the UE 1 in the eNodeB 2. Alternatively, in an arrangement in which the eNodeB 2 is connected to a plurality of MMEs 6, a combination of the MME UE S1AP ID and the MME identifier can be used to uniquely identify the UE 1 in the eNodeB 2.

The second identifier may include an S1 S-GW TEID, or a combination of an S1 S-GW TEID and an S-GW identifier (e.g., an S-GW address). For example, in an arrangement in which the eNodeB 2 is connected to only one S-GW (S/P-GW 7 or 8), the S1 S-GW TEID can be used to uniquely identify the UE 1 in the eNodeB 2. Alternatively, in an arrangement in which the eNodeB 2 is connected to a plurality of S-GWs (S/P-GWs 7 or 8), a combination of the S1 S-GW TEID and the S-GW identifier can be used to uniquely identify the UE 1 in the eNodeB 2.

The eNodeB 2 and the S/P-GW 7 or 8 use a common identifier(s), that is, an S1 eNB TEID and an S1 S-GW TEID, to specify an S1 bearer of the UE 1. Accordingly, the eNodeB 2 is able to associate the first identifier (e.g., the UE IP address) of the UE 1 received from the S/P-GW 7 or 8 with the S1 eNB TEID and the S1 S-GW TEID that is used to specify an S1 bearer of this UE 1. Further, the eNodeB 2 is able to associate the first identifier (e.g., the UE IP address) of the UE 1 with another identifier (e.g., the C-RNTI, the eNodeB UE S1AP ID, or the MME UE S1AP ID) based on the S1 eNB TEID and the S S-GW TEID.

Referring back to FIG. 2, in Step 203, the eNodeB 2 communicates with the MEC server 5 using the first identifier (e.g., the UE IP address) to specify the UE 1. In some implementations, in response to receiving a request message containing the first identifier (e.g., the UE IP address) from the MEC server 5, the eNodeB 2 performs the radio resource management regarding the UE 1 identified by the first identifier. For example, the radio resource management includes: establishment, modification, and release of a radio connection (e.g., RRC connection) with the UE 1; scheduling of radio resources for the UE 1; configuration of dedicated scheduling request (D-SR) resources for the UE 1; and controlling of a handover of the UE 1. In some implementations, the MEC server 5 may notify the eNodeB 2 of MEC control information including at least one of delay requirements, throughput requirements, and priority requirements regarding the specific UE 1 identified by the first identifier.

The delay requirements may indicate at least one of a maximum delay, an average delay, a delay jitter, and priority regarding delay guarantee. The delay requirements may indicate a period during which the delay requirements are required, a schedule in which the delay requirements are required, or the number of times that the delay requirements are required. The delay requirements may be configured separately for the uplink and the downlink. The delay here may be, for example, a delay until the UE 1 completes transmission of data to the RAN 3, a delay until the data of the UE 1 arrives at a destination (e.g., the MEC server 5), or a delay until the RAN 3 completes transmission of data to the UE 1.

The throughput requirements may indicate at least one of a lowest throughput (a minimum throughput that should be guaranteed), an average throughput, a requested throughput (sufficient throughput), a minimum radio bandwidth, an average radio bandwidth, and a requested radio bandwidth.

The priority requirements may indicate at least one of: relative or absolute priorities among UEs 1 that use the MEC; and a relative or absolute priority of UEs 1 that use the MEC with respect to other UEs 1 that does not use the MEC.

The mobility requirements may indicate at least one of: whether to guarantee the mobility; and a value or level (e.g. high, medium (or normal), low) of a moving speed for which the mobility is guaranteed.

The MEC control information may indicate a data pattern or an application or service type (e.g., voice, video, Machine-to-Machine (M2M) control command) to specify a data flow(s) to which the MEC control information (e.g., the delay requirements) should be applied. Further or alternatively, the MEC control information may indicate a goal to be accomplished (e.g., completion percentage, number of successes).

The example shown in FIG. 2 can be changed as appropriate. In some implementations, the S/P-GW 7 or 8 may notify the eNodeB 2 of another identifier regarding the UE 1 in addition to the first identifier (e.g., the UE IP address). For example, the S/P-GW 7 or 8 may notify the eNodeB 2 of information indicating a Traffic Flow Template (TFT) regarding an EPS bearer of the UE 1. The TFT is a packet filter to map one or more IP packet flows (Service Data Flows (SDFs)) of the UE 1 to the EPS bearer of the UE 1. The TFT information includes, for example, an IP address of an MEC application with which the UE 1 communicates (i.e., an uplink destination address or a downlink source address).

As described above, in the example shown in FIG. 2, the eNodeB 2 acquires the first identifier that is used by the MEC server 5 or by applications (or services) hosted on the MEC server 5 to identify the UE 1, and associates this first identifier with the second identifier that is used by the eNodeB 2 to identify the UE 1. This allows the eNodeB 2 and the MEC server 5 to use a common UE identifier, i.e., the first identifier. Accordingly, the eNodeB 2 and the MEC server 5 are able to directly exchange therebetween control messages regarding a specific UE 1 by using the first identifier to specify the UE 1.

Further, in some implementations, the configuration in which the S/P-GW 8 notifies the eNodeB 2 of the first identifier (e.g., the UE IP address) has the following advantages over the configuration in which another node (e.g., the MME 6) notifies the eNodeB 2 of the first identifier. In order to allow MEC applications hosted on the MEC server 5 installed in the site of the eNodeB 2 to communicate with a UE 1 on the user plane, the P-GW function for terminating an EPS bearer of this UE 1 is preferably arranged in the eNodeB 2. Accordingly, the arrangement in which an S/P-GW is located in the site of the eNodeB 2 along with the MEC server 5 is considered to be the typical arrangement in MEC. Further, as already described above, the configuration in which the MEC server 5 hosts network functions including the virtualized S/P-GW 8 may also be the typical arrangement in MEC. When the above-described circumstances specific to MEC are taken into account, the configuration in which the virtualized S/P-GW 8 co-located with the eNodeB 2 supplies the first identifier to the eNodeB 2 will probably be achieved easier than the configuration in which the MME 6 in the core network 4 supplies the first identifier to the eNodeB 2. This is because the virtualized S/P-GW 8 can be hosted on the MEC server 5 for MEC and the software of the virtualized S/P-GW 8 can be easily modified. On the other hand, it is assumed that the MME 6 is not dedicated to MEC and is also used for normal cellular communications.

Furthermore, as described above, in some implementations, a Private Extension information element contained within a GTP-U signalling message may be used to send the first identifier (e.g., the UE IP address) from the S-GW (the S/P-GW 7 or 8) to the eNodeB 2. This example has an advantage that no modification is needed to the GTP-U signalling message to forward the first identifier.

Second Embodiment

This embodiment provides another procedure for allowing the eNodeB 2 and the MEC server 5 to use a common UE identifier. A configuration example of a mobile communication network according to this embodiment is similar to the example shown in FIG. 1.

Figure 3:
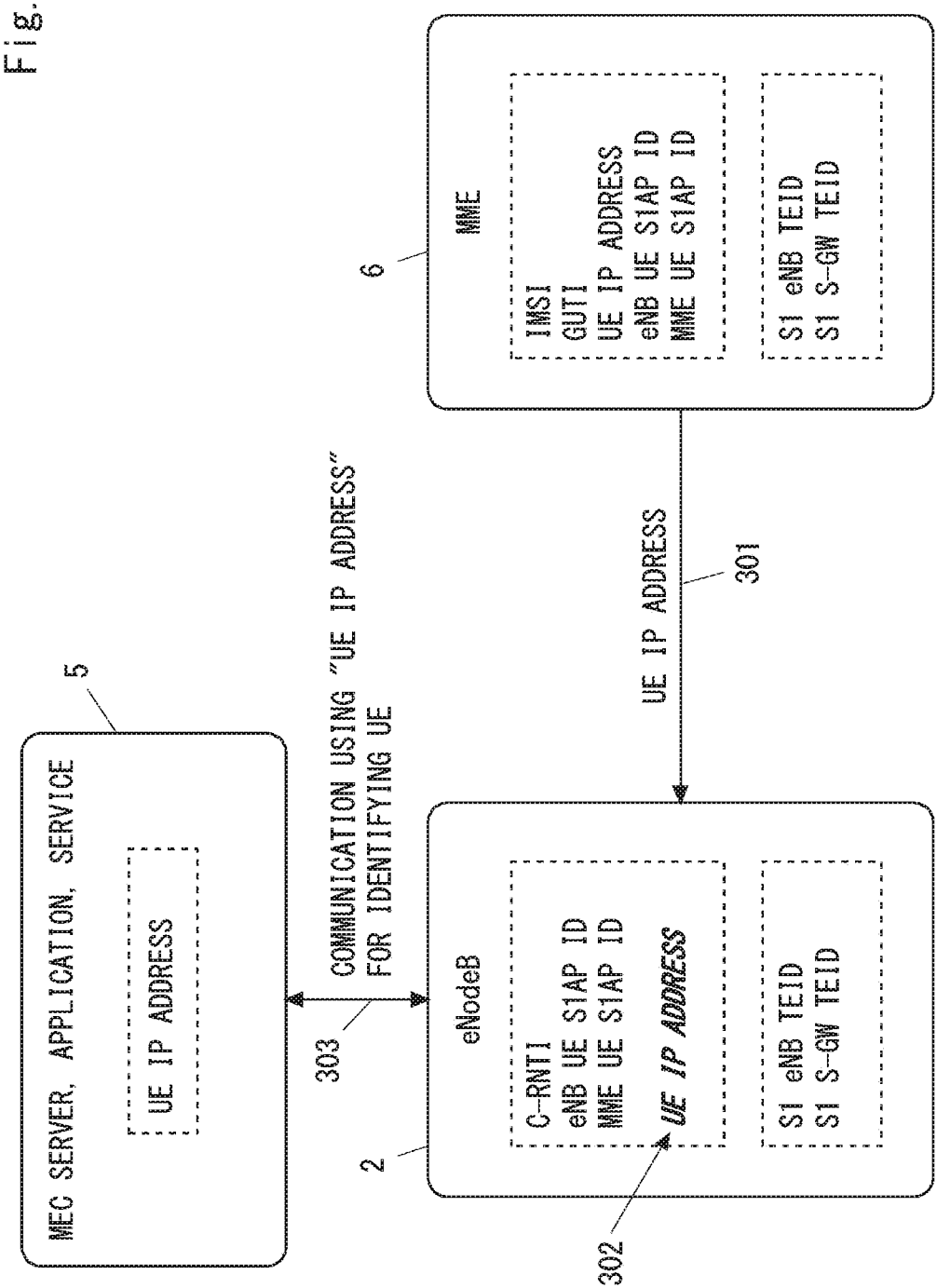
FIG. 3 is a diagram showing one example of operations of an eNodeB, an MEC server, and an MME according to a second embodiment.

FIG. 3 shows one example of operations of the eNodeB 2, the MEC server 5, and the MME 6. In Step 301, the eNodeB 2 receives a first identifier (e.g., a UE IP address) from the MME 6. As described in the first embodiment, the first identifier is used by the MEC server 5 or applications (or services) hosted on the MEC server 5 to identify the UE 1. In some implementations, the eNodeB 2 may receive the first identifier through a signalling interface between the MME 6 and the eNodeB 2 (i.e., an S-MME interface). The eNodeB 2 may acquire the first identifier from an existing or new information element contained within an S1AP message received from the MME 6. The eNodeB 2 may receive the first identifier from the MME 6 in any procedure that involves signalling with the MME 6 regarding the UE 1, such as an attach procedure or a service request procedure.

In Step 302, the eNodeB 2 associates the first identifier received from the MME 6 with a second identifier that is used by the eNodeB 2 to identify the UE 1. Specific examples of the second identifier are similar to the examples described in the first embodiment.

The eNodeB 2 and the MME 6 use a common identifier (i.e., an eNodeB UE S1AP ID and an MME UE S1AP ID) to identify the UE 1. Accordingly, the eNodeB 2 is able to associate the first identifier (e.g., the UE IP address) of the UE 1 received from the MME 6 with the eNodeB UE S1AP ID and the MME UE S1AP ID of the UE 1. Further, the eNodeB 2 is able to associate the first identifier (e.g., the UE IP address) of the UE 1 with another identifier (e.g., a C-RNTI, an S1 eNB TEID, or an S1 S-GW TEID) based on the eNodeB UE S1AP ID and the MME UE S1AP ID.

Step 303 is similar to Step 203 in FIG. 2.

According to the example shown in FIG. 3, the eNodeB 2 acquires the first identifier that is used by the MEC server 5 or by applications (or services) hosted on the MEC server 5 to identify the UE 1, and associates this first identifier with the second identifier that is used by the eNodeB 2 to identify the UE 1. Similar to the first embodiment, this allows the eNodeB 2 and the MEC server 5 to use a common UE identifier, i.e., the first identifier (e.g., the UE IP address).

Third Embodiment

This embodiment provides another procedure for enabling the eNodeB 2 and the MEC server 5 to use a common UE identifier. A configuration example of a mobile communication network according to this embodiment is similar to that shown in FIG. 1.

Figure 4:
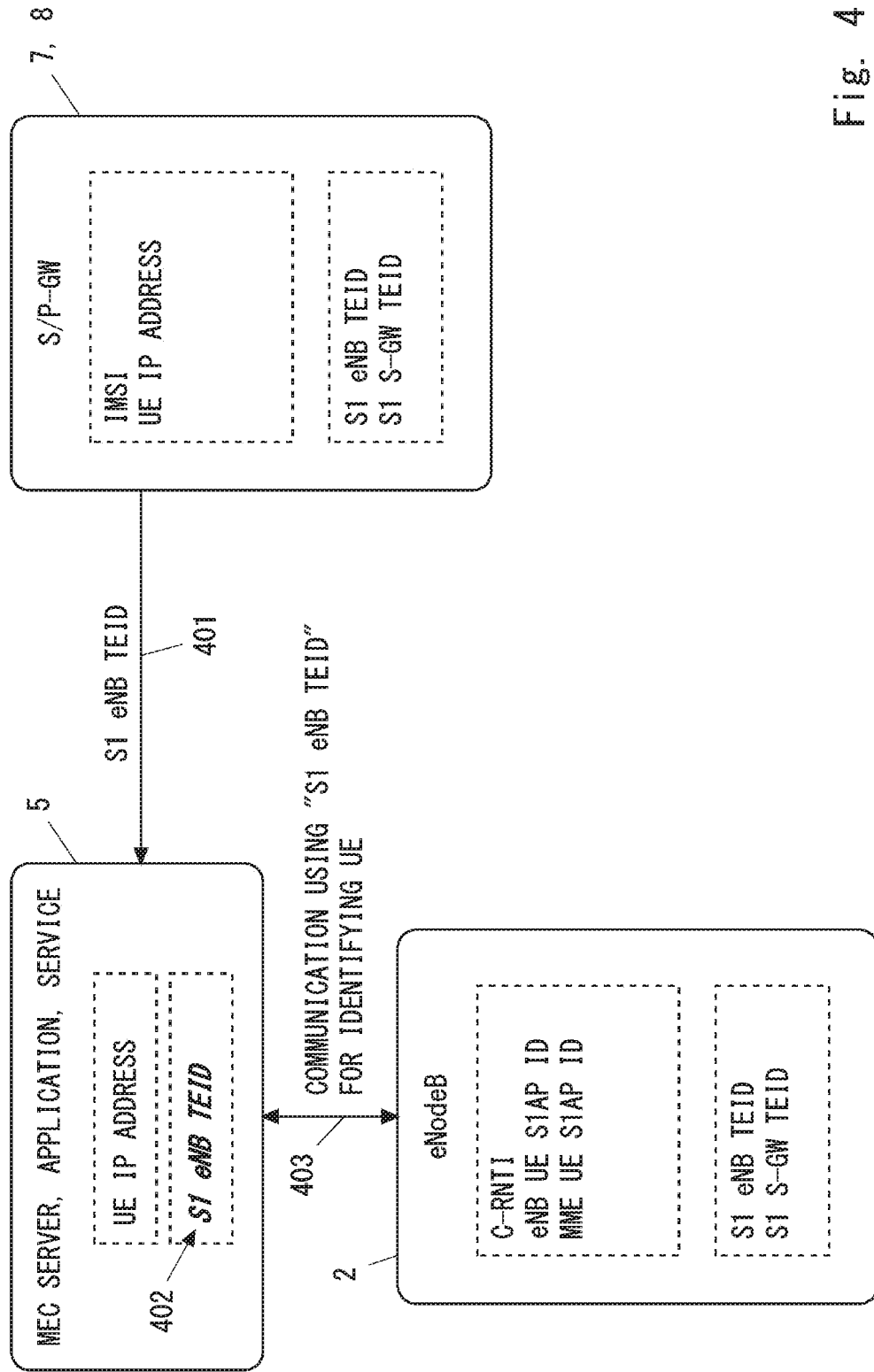
FIG. 4 is a diagram showing one example of operations of an eNodeB, an MEC server, and an S/P-GW according to a third embodiment.

FIG. 4 shows one example of operations of the eNodeB 2, the MEC server 5, and the S/P-GW 7 or 8. The S/P-GW 7 or 8 shown in FIG. 4 means the S-GW alone, the P-GW alone, or both the S-GW and the P-GW. The S/P-GW 7 or 8 may be the S/P-GW 7 arranged in the core network 4 or may be the S/P-GW 8 co-located in the location of the eNodeB 2 along with the MEC server 5. The S/P-GW 8 may be an S/P-GW virtualized on a platform that is the same as or differs from the MEC server 5.

In Step 401, the MEC server 5 receives, from the S/P-GW 7 or 8, a second identifier (e.g., an S1 eNB TEID) that is used by the eNodeB 2 to identify the UE 1. Specific examples of the second identifier are similar to the examples described in the first embodiment. The S/P-GW 7 or 8 manages an S1 eNB TEID and an S1 S-GW TEID to specify an S1 bearer of the UE 1. Accordingly, the second identifier transmitted in Step 401 may include only the S1 eNB TEID or a combination of the S1 eNB TEID and the S1 S-GW TEID. The second identifier transmitted in Step 401 may include a combination of the S1 S-GW TEID and an S-GW identifier (e.g., an S-GW address).

In some implementations, the MEC server 5 may acquire the second identifier by analyzing a control message (i.e., a GTP for Control plane (GTP-C) message) transmitted from the virtualized S/P-GW 8 to the MME 6 on an S11 interface.

In Step 402, the MEC server 5 associates the second identifier received from the S/P-GW 7 or 8 with a first identifier used by the MEC server 5 or applications (or services) hosted on the MEC server 5 to identify the UE 1. The first identifier is, for example, a UE IP address or an application-layer ID (or name) of the UE 1.

The MEC server 5 and the S/P-GW 7 or 8 use a common identifier (i.e., a UE IP address) to specify the UE 1. In some implementations, the MEC server 5 may acquire the UE IP address of the UE 1 from an MEC application hosted on the MEC server. The MEC server 5 is thus able to associate a second identifier (e.g., an S1 eNB TEID) of the UE 1 received from the S/P-GW 7 or 8 with the UE IP address of the UE 1. Further, the MEC server 5 is able to associate the second identifier of the UE 1 (e.g., the S eNB TEID) with another identifier (e.g., an application layer ID of the UE 1) based on the UE IP address.

In Step 403, the MEC server 5 communicates with the eNodeB 2 using the second identifier (e.g., the S1 eNB TEID) to specify the UE 1. In some implementations, the MEC server 5 may transmit a request message containing the second identifier (e.g., the S eNB TEID) to the eNodeB 2, thereby requesting the eNodeB 2 to perform special radio resource management for the specific UE 1 identified by the second identifier. In some implementations, the MEC server 5 may notify the eNodeB 2 of delay requirements, throughput requirements, or priority requirements regarding the specific UE 1 identified by the second identifier.

According to the example shown in FIG. 4, the MEC server 5 acquires the second identifier that is used by the eNodeB 2 to identify the UE 1, and associates the second identifier with the first identifier that is used by the MEC server 5 or applications (or services) hosted on the MEC server 5 to identify the UE 1. This allows the eNodeB 2 and the MEC server 5 to use a common UE identifier (i.e., the second identifier). Accordingly, the eNodeB 2 and the MEC server 5 are able to directly exchange therebetween control messages regarding a specific UE 1 by using the second identifier to specify the UE 1.

Further, in some implementations, the configuration in which the S/P-GW 8 notifies the MEC server 5 of the second identifier (e.g., the S eNB TEID) has the following advantage over the configuration in which another node (e.g., the MME 6) notifies the MEC server 5 of the second identifier. In order to allow MEC applications hosted on the MEC server 5 installed in the site of the eNodeB 2 to communicate with a UE 1 on the user plane, the P-GW function for terminating an EPS bearer of the UE 1 is preferably arranged in the eNodeB 2. Accordingly, the arrangement in which an S/P-GW is located in the site of the eNodeB 2 along with the MEC server 5 is considered to be the typical arrangement in MEC. Further, as already described above, the configuration in which the MEC server 5 hosts network functions including the virtualized S/P-GW 8 may also be the typical arrangement in MEC. When the above-described circumstances specific to MEC are taken into account, the configuration in which the virtualized S/P-GW 8 co-located with the MEC server 5 supplies the second identifier to the MEC server 5 may be probably achieved easier than the configuration in which the MME 6 in the core network 4 supplies the second identifier to the MEC server 5. This is because the virtualized S/P-GW 8 can be hosted on the MEC server 5 for MEC and also the software of the virtualized S/P-GW 8 can be easily modified. On the other hand, it is assumed that the MME 6 is not dedicated to MEC and is also used for normal cellular communications.

Further, in some implementations, the second identifier sent from the S/P-GW 7 or 8 to the MEC server 5 may be an identifier that is not changed when an inter-eNB handover is performed. This allows the MEC server 5 to avoid frequent updates of the second identifier. The second identifier may be, for example, the S1 S-GW TEID or a combination of the S1 S-GW TEID and the S-GW identifier (e.g., the S-GW address). Unless the S-GW is changed after the inter-eNB handover, each of the S1 S-GW TEID and the S-GW identifier is the same before and after the inter-eNB handover.

Fourth Embodiment

This embodiment provides another procedure for allowing the eNodeB 2 and the MEC server 5 to use a common UE identifier. A configuration example of a mobile communication network according to this embodiment is similar to that shown in FIG. 1.

Figure 5:
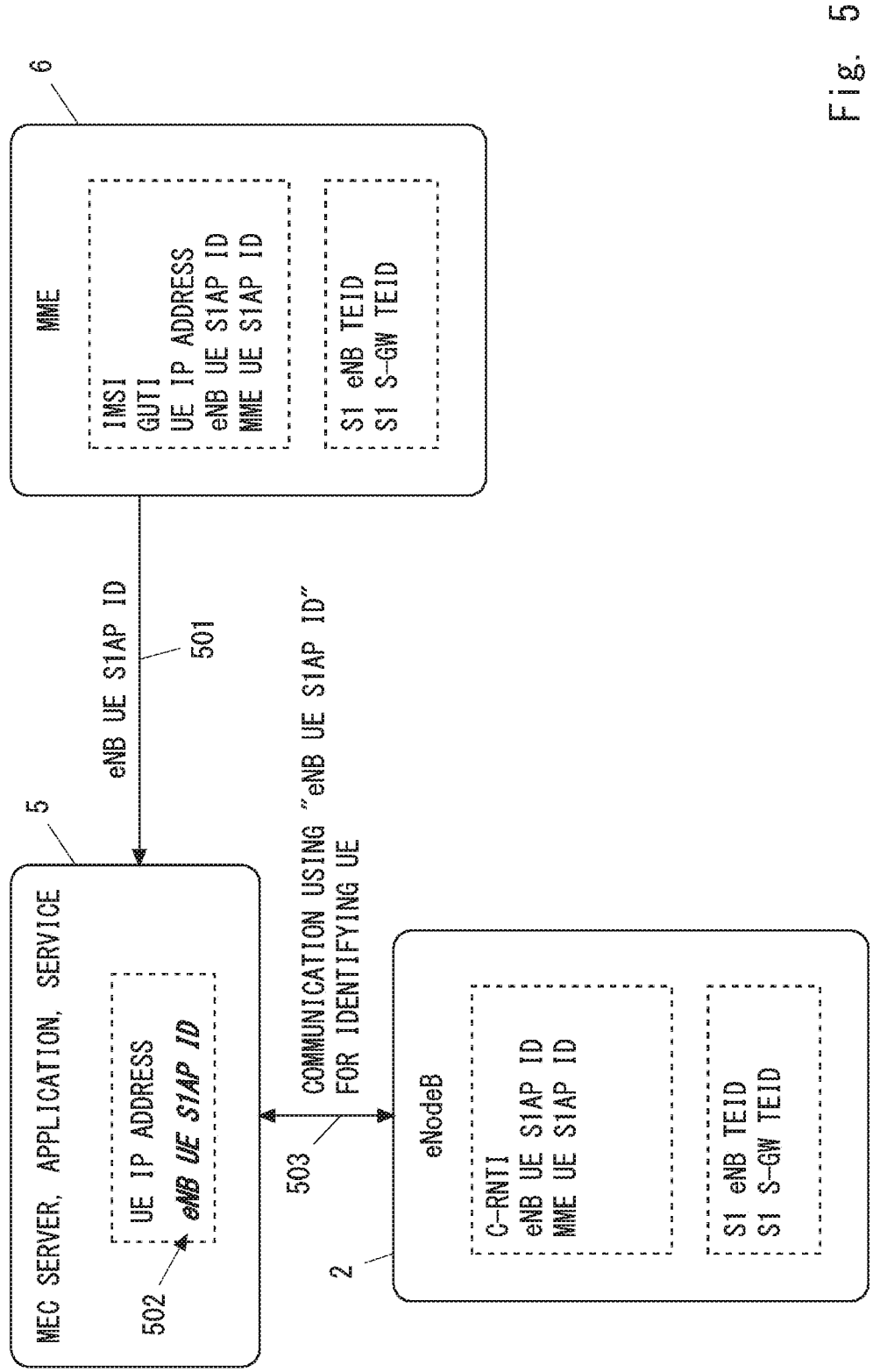
FIG. 5 is a diagram showing one example of operations of an eNodeB, an MEC server, and an MME according to a fourth embodiment.

FIG. 5 shows one example of operations of the eNodeB 2, the MEC server 5, and the MME 6. In Step 501, the MEC server 5 receives from the MME 6 a second identifier (e.g., an eNB UE S1AP ID) that is used by the eNodeB 2 to identify the UE 1. Specific examples of the second identifier are similar to the examples described in the first embodiment. The MME 6 manages an eNodeB UE S1AP ID, an MME UE S1AP ID, an S1 eNB TEID, and an S1 S-GW TEID for the UE 1. These identifiers are managed for the UE 1 also in the eNodeB 2. Accordingly, the second identifier transmitted in Step 501 may include one or both of the eNodeB UE S1AP ID and the S eNB TEID. The second identifier transmitted in Step 501 may include a combination of the eNodeB UE S1AP ID and the MME UE S1AP ID. The second identifier transmitted in Step 501 may include a combination of the MME UE S1AP ID and an identifier of the MME (e.g., an MMEC, an MMEI, or a GUMMEI). The second identifier transmitted in Step 501 may include a combination of the S1 eNB TEID and the S1 S-GW TEID. The second identifier transmitted in Step 4501 may include a combination of the S1 S-GW TEID and an identifier of the S-GW (e.g., an S-GW address).

Step 502 is similar to Step 402 in FIG. 4. That is, in Step 502, the MEC server 5 associates the second identifier received from the MME 6 with a first identifier that is used by the MEC server 5 or applications (or services) hosted on the MEC server 5 to identify the UE 1. The first identifier is, for example, a UE IP address or an application-layer ID (or name) of the UE 1.

Step 503 is similar to Step 403 in FIG. 4. That is, the MEC server 5 communicates with the eNodeB 2 using the second identifier (e.g., the eNB UE S1AP ID) to specify the UE 1.

In the example shown in FIG. 5, the MEC server 5 acquires the second identifier that is used by the eNodeB 2 to identify the UE 1, and associates this second identifier with the first identifier that is used by the MEC server 5 or by applications (or services) hosted on the MEC server 5 to identify the UE 1. Accordingly, similar to the third embodiment, the eNodeB 2 and the MEC server 5 are able to use a common UE identifier, i.e., the second identifier (e.g., the eNB UE S1AP ID).

Further, in some implementations, the second identifier sent from the MME 6 to the MEC server 5 may be an identifier that is not changed when an inter-eNB handover is performed. This allows the MEC server 5 to avoid frequent updates of the second identifier. The second identifier may be, for example, the MME UE S1AP ID, or a combination of the MME UE S1AP ID and the MME identifier (e.g., the MMEC, the MMEI, or the GUMMEI). Unless the MME is changed after the inter-eNB handover, each of the MME UE S1AP ID and the MME identifier is the same before and after the inter-eNB handover.

Fifth Embodiment

This embodiment provides a modified example of the procedure shown in FIG. 5 according to the fourth embodiment. A configuration example of a mobile communication network according to this embodiment is similar to that shown in FIG. 1.

Figure 6:
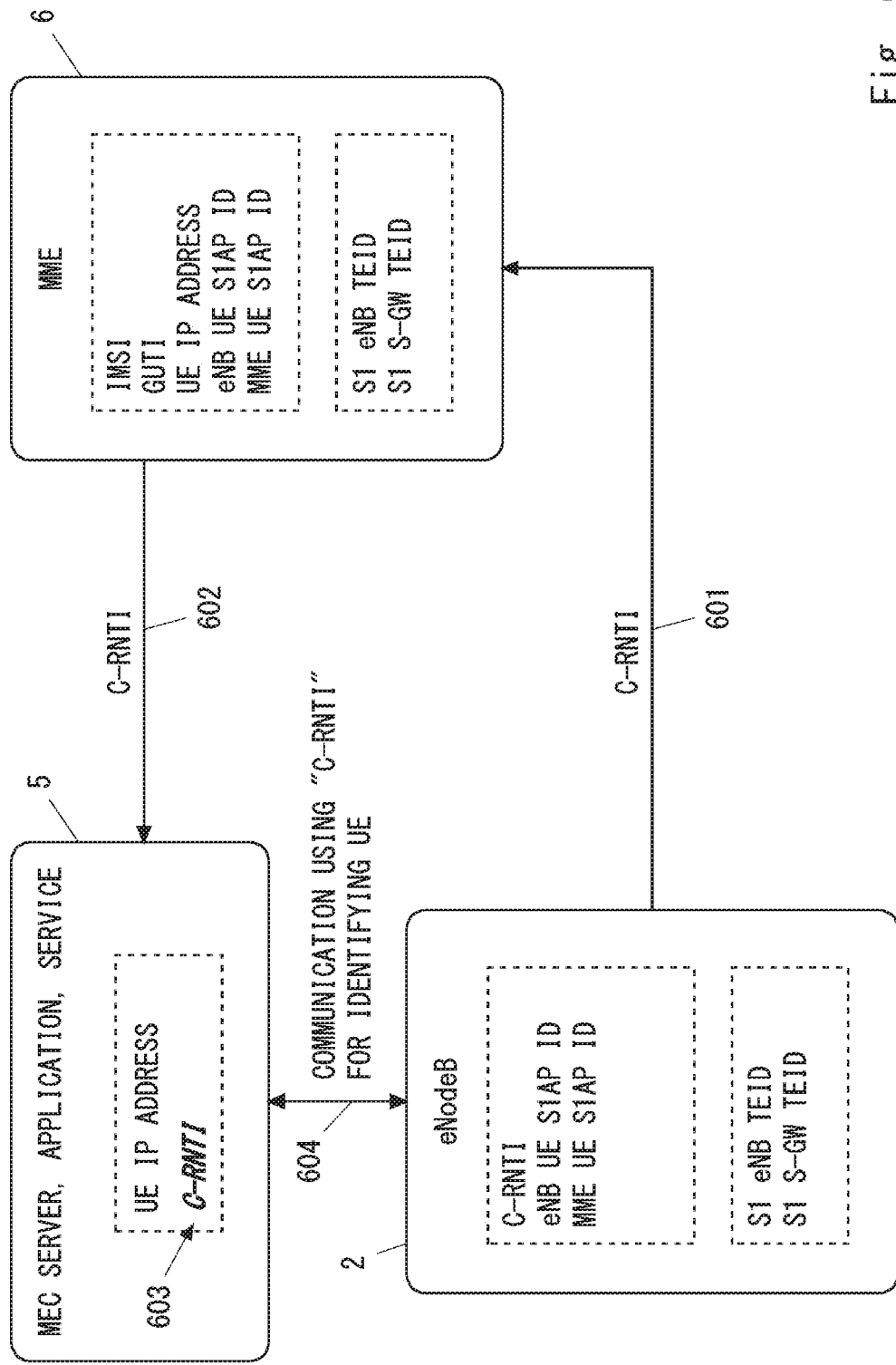
FIG. 6 is a diagram showing one example of operations of an eNodeB, an MEC server, and an MME according to a fifth embodiment.

FIG. 6 shows one example of operations of the eNodeB 2, the MEC server 5, and the MME 6. In the example shown in FIG. 6, the eNodeB 2 sends to the MEC server 5, via the MME 6, a C-RNTI that is used by the eNodeB 2 to identify the UE 1. In other words, in the example shown in FIG. 6, the C-RNTI is used as the second identifier.

In Step 601, the eNodeB 2 transmits to the MME 6 the C-RNTI used by the eNodeB 2 to identify the UE 1. In some implementations, the eNodeB 2 may include the C-RNTI of the UE 1 into an S1AP message transmitted to the MME 6 on an S1-MME interface for the UE 1 (e.g., S1AP Initial UE message, S1AP Path Switch Request, S1AP Handover Request Acknowledge, or S1AP Handover Notify).

The eNodeB 2 and the MME 6 use a common identifier (i.e., an eNodeB UE S1AP ID and an MME UE S1AP ID) to specify the UE 1. Accordingly, the MME 6 is able to associate the C-RNTI received from the eNodeB 2 with the eNodeB UE S1AP ID and the MME UE S1AP ID of this UE 1. Further, the MME 6 is able to associate the C-RNTI of the UE 1 with a UE IP address of the UE 1 based on the eNodeB UE S1AP ID and the MME UE S1AP ID.

In Step 602, the MEC server 5 receives from the MME 6 the C-RNTI that is used by the eNodeB 2 to identify the UE 1. Step 603 is similar to Step 502 shown in FIG. 5. However, in FIG. 6, the C-RNTI is used as the second identifier, and the MEC server 5 associates the C-RNTI received from the MME 6 with a first identifier that is used by the MEC server 5 or applications (or services) hosted on the MEC server 5 to identify the UE 1. The first identifier is, for example, a UE IP address or an application-layer ID (or name) of the UE 1. Step 604 is similar to Step 503 in FIG. 5. However, the MEC server 5 communicates with the eNodeB 2 using the C-RNTI to specify the UE 1.

The eNodeB 2 uses the C-RNTI to identify the UE 1 in the radio resource management (e.g., scheduling) in the access stratum (AS) and in the RRC connection with the UE 1. Thus, in the example shown in FIG. 6, when the MEC server 5 requests the eNodeB 2 to perform special radio resource management for a specific UE 1, the MEC server 5 can communicate with the eNodeB 2 using the UE identifier in accordance with the radio resource management in the eNodeB 2.

Sixth Embodiment

In some implementations, to allow the eNodeB 2 and the MEC server 5 to use a common UE identifier, another control node such as an NFV controller 700 may be used. The other control node (e.g., the NFV controller 700) may mediate the communication between the eNodeB 2 and the MEC server 5.

Figure 7:
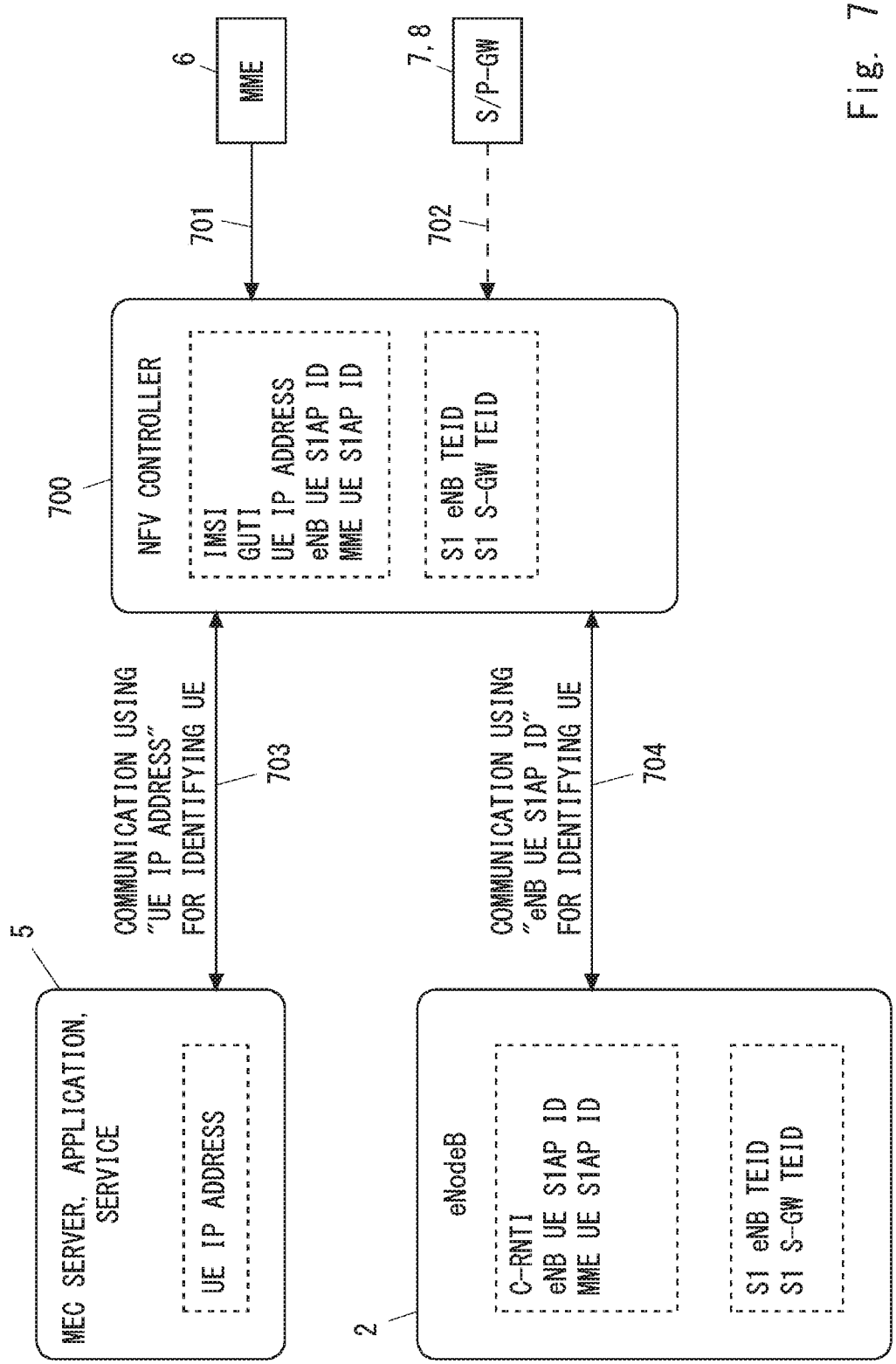
FIG. 7 is a diagram showing one example of operations of an eNodeB, an MEC server, and an NFV controller according to a sixth embodiment.

FIG. 7 shows one example of operations of the eNodeB 2, the MEC server 5, and the NFV controller 700. In Step 701, the NFV controller 700 receives various identifiers of the UE 1 from the MME 6. Further or alternatively, the NFV controller 700 may receive various identifiers of the UE 1 from the S/P-GW 7 or 8 (Step 702). These various identifiers include the above-described first identifier (e.g., a UE IP address) and the second identifier (e.g., an eNB UE S1AP ID).

In Steps 703 and 704, the NFV controller 700 mediates the communication between the eNodeB 2 and the MEC server 5 that use different UE identifiers. For example, in response to receiving a message containing the first identifier (e.g., the UE IP address) from the MEC server 5, the NFV controller 700 replaces the first identifier in this message with the second identifier (e.g., the eNB UE S1AP ID), and transmits a message containing the second identifier to the eNodeB 2. Further or alternatively, in response to receiving a message containing the second identifier from the eNodeB 2, the NFV controller 700 replaces the second identifier in this message with the first identifier, and transmits a message containing the first identifier to the MEC server 5.

According to the example shown in FIG. 7, by using the mediation of the NFV controller 700, the eNodeB 2 and the MEC server 5 are able to exchange control messages regarding a specific UE 1.

Seventh Embodiment

This embodiment provides an example of communication between the eNodeB 2 and the MEC server 5 that use a common UE identifier. A configuration example of a mobile communication network according to this embodiment is similar to that shown in FIG. 1.

Figure 8:
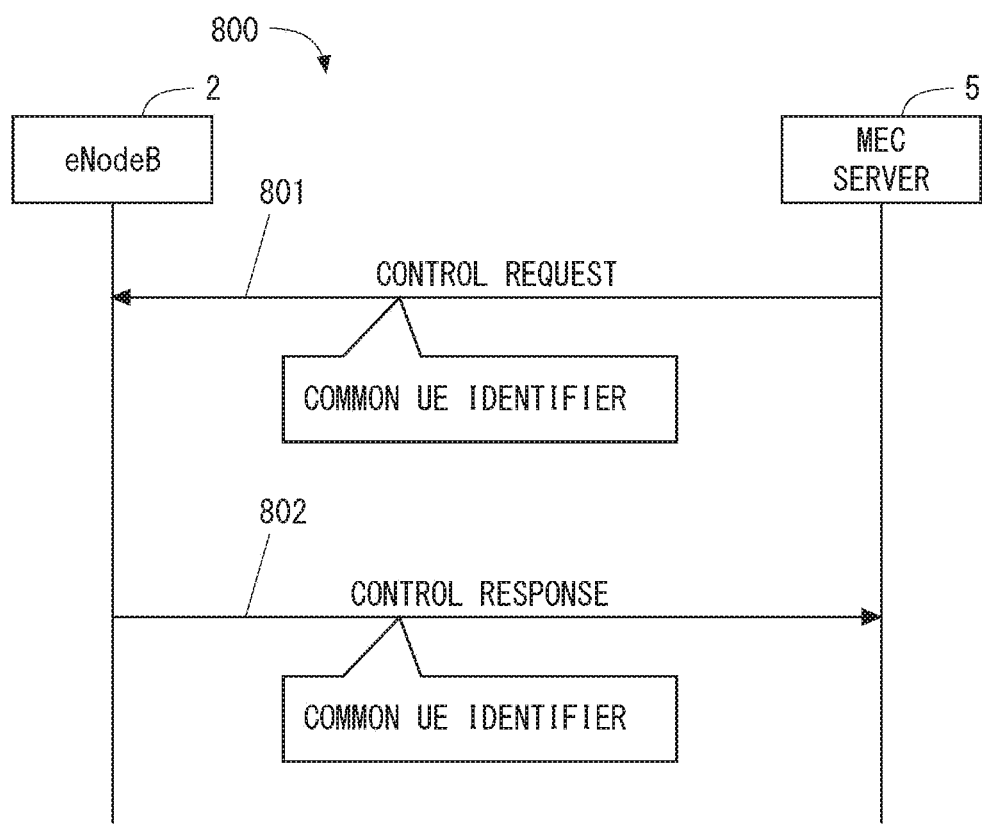
FIG. 8 is a sequence diagram showing one example of operations of an eNodeB and an MEC server according to a seventh embodiment.

FIG. 8 is a sequence diagram showing one example of operations (Process 800) of the eNodeB 2 and the MEC server 5. In Step 801, the MEC server 5 transmits, to the eNodeB 2, a control request message containing a common UE identifier to identify a specific UE 1. When the procedure described in the first or second embodiment is used, the common UE identifier is the first identifier (e.g., the UE IP address). On the other hand, when the procedure described in the third, fourth, or fifth embodiment is used, the common UE identifier is the second identifier (e.g., the S1 eNB TEID, the eNB UE S1AP ID, or the C-RNTI).

In some implementations, the control request message transmitted in Step 801 may request that the eNodeB 2 perform special radio resource management for the specific UE 1. For example, the radio resource management includes: establishment, modification, and release of a radio connection (e.g., RRC connection) with the UE 1; scheduling of radio resources for the UE 1; configuration of dedicated scheduling request (D-SR) resources for the UE 1; and controlling of a handover of the UE 1. In some implementations, the MEC server 5 may notify the eNodeB 2 of delay requirements, throughput requirements, or priority requirements regarding the specific UE 1.

In Step 802, the eNodeB 2 transmits to the MEC server 5 a control response message in response to the request transmitted in Step 801. The control response message contains the common UE identifier to identify a specific UE 1. In some implementations, the control response message may indicate the result of the requested control (e.g., success or failure).

Eighth Embodiment

This embodiment provides another example of communication between the eNodeB 2 and the MEC server 5 that use a common UE identifier. A configuration example of a mobile communication network according to this embodiment is similar to that shown in FIG. 1.

Figure 9:
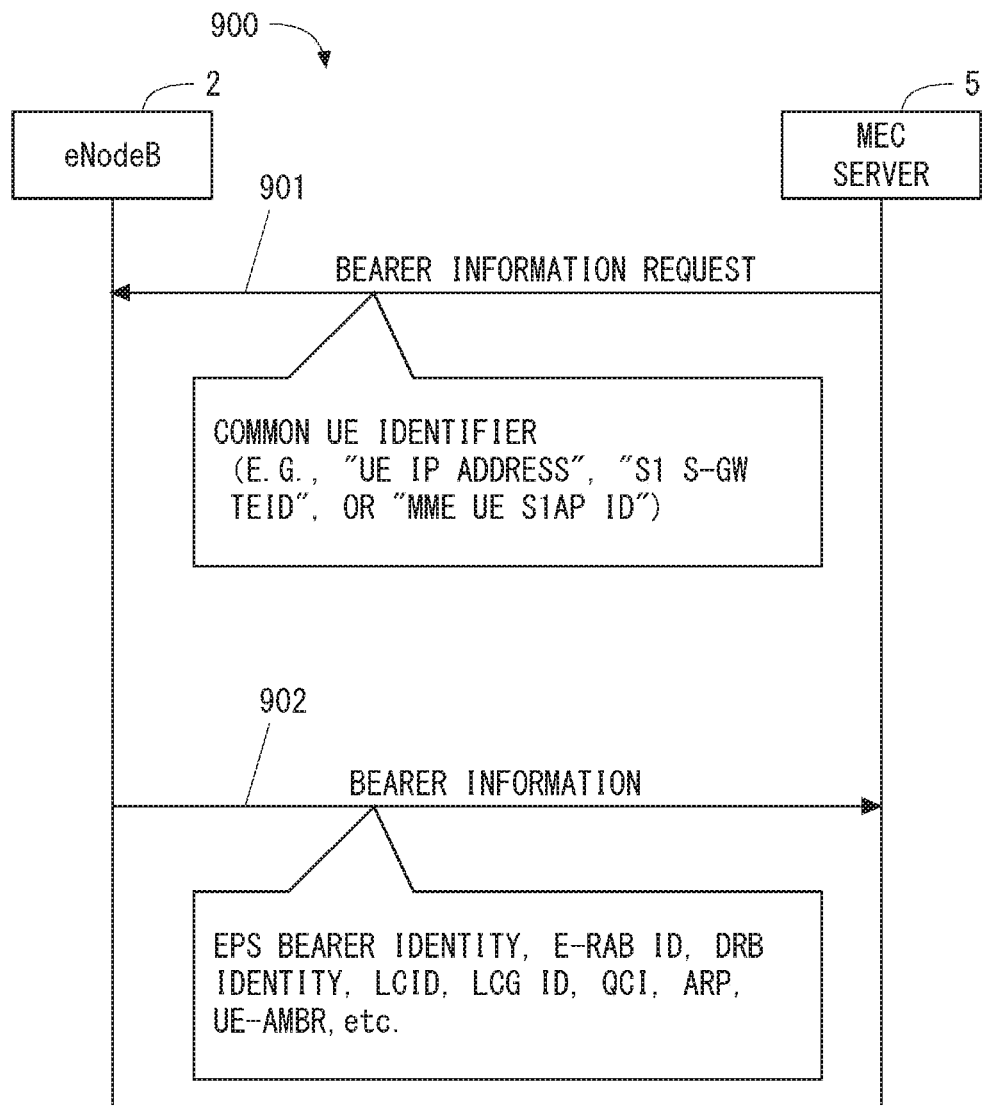
FIG. 9 is a sequence diagram showing one example of operations of an eNodeB and an MEC server according to an eighth embodiment.

FIG. 9 is a sequence diagram showing one example of operations (Process 900) of the eNodeB 2 and the MEC server 5. In the example shown in FIG. 9, the MEC server 5 communicates with the eNodeB 2 using a common UE identifier to identify a specific UE 1 and acquires, from the eNodeB 2, information regarding a radio bearer or logical channel configured for the specific UE 1. By using the acquired information regarding the radio bearer or the logical channel, the MEC server 5 is able to easily send to the eNodeB 2 a control request about the specific UE 1 on a per-radio-bearer basis or a per-logical-channel basis.

In Step 901, the MEC server 5 transmits a bearer information request message containing the common UE identifier to identify the specific UE 1 to the eNodeB 2. When the procedure described in the first or second embodiment is used, the common UE identifier is the first identifier (e.g., the UE IP address). On the other hand, when the procedure described in the third, fourth, or fifth embodiment is used, the common UE identifier is the second identifier (e.g., the S1 eNB TEID, the eNB UE S1AP ID, or the C-RNTI).

In Step 902, the eNodeB 2 transmits bearer information regarding the specific UE 1 to the MEC server 5 in response to the request transmitted in Step 901. This bearer information may include, for example, an identifier of a radio bearer or a logical channel configured for the specific UE 1. In some implementations, the identifier of the radio bearer or the logical channel includes at least one of an EPS Bearer Identity, an E-UTRAN Radio Access Bearer (E-RAB) ID, a Data Radio Bearer (DRB) Identity, a Logical Channel Identity (LCID), and a Logical Channel Group (LCG) ID. Further or alternatively, this bearer information may include a Quality of Service (QoS) parameter regarding the radio bearer or the logical channel configured for the specific UE 1. This QoS parameter is taken into account in the radio resource scheduling performed by the eNodeB 2. In some implementations, this QoS parameter includes at least one of a QoS Class Identifier (QCI), an Allocation and Retention Priority (ARP), a Guaranteed Bit rate (GBR) for GBR type EPS bearer, and a UE Aggregate Maximum Bit Rate (UE-AMBR) for non-GBR type EPS bearer.

Ninth Embodiment

The above-described first to eighth embodiments provides the examples in which the MEC server 5 is coupled to the eNodeB 2 as a RAN node. Instead, the MEC server 5 may be coupled to another RAN node. This embodiment provides an example in which the MEC server 5 is coupled to a Home eNodeB Gateway (HeNB-GW).

Figure 10:
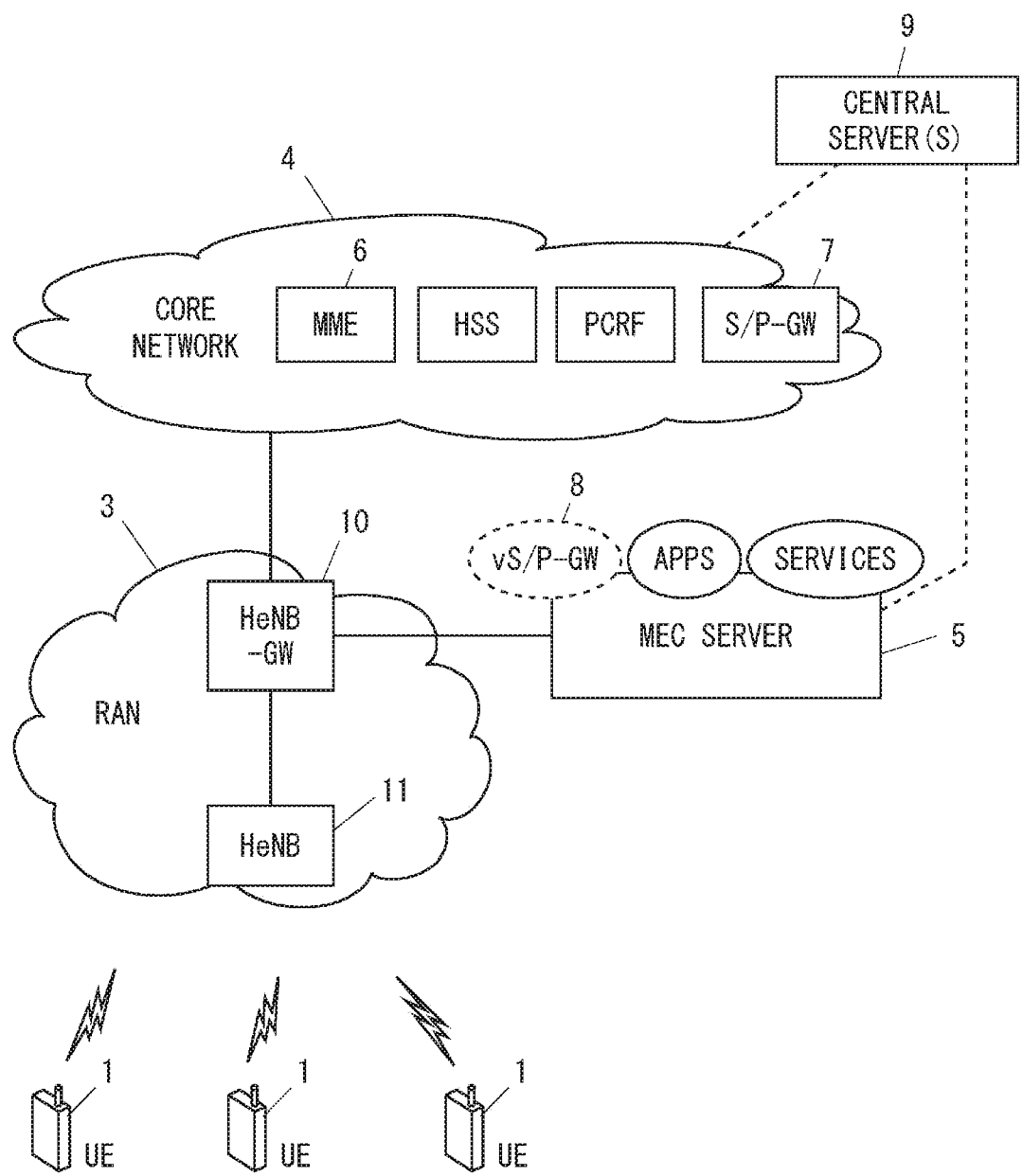
FIG. 10 is a diagram showing a configuration example of a mobile communication network according to a ninth embodiment.

FIG. 10 shows a configuration example of a mobile communication network according to this embodiment. In the example shown in FIG. 10, the mobile communication network includes an HeNB-GW 10 and an HeNB 11. The HeNB 11 is arranged in the RAN 3 and provides the eNodeB functions. That is, the HeNB 11 is configured to communicate with one or more radio terminals 1 (i.e., User Equipments (UEs)) connected to the RAN 3 and to provide radio resource management for the UE (s) 1.

The HeNB-GW 10 is arranged between the HeNB 11 and the EPC 4 and relays control plane signals (i.e., S1AP messages) between the HeNB 11 and the EPC 4 (i.e., the MME 6). More specifically, the HeNB-GW 10 relays UE-associated S1AP messages between the MME 6 and the HeNB 11, and terminates non-UE associated S1AP messages directed to the HeNB 11 and the MME 6. Further, the HeNB-GW 10 may terminate an S1-U interface with the S/P-GW 7 (or the virtualized S/P-GW 8) and an S1-U interface with the HeNB 11.

In the example shown in FIG. 10, the MEC server 5 is arranged in the RAN 3 in such a way that the MEC server 5 is able to directly communicate with the HeNB-GW 10, which is a RAN node. In some implementations, the MEC server 5 may be physically integrated with the HeNB-GW 10. In some implementations, the MEC server 5 may be installed in the same building (or site) as the HeNB-GW 10, and may be connected to a Local Area Network (LAN) in this site in such a way that the MEC server 5 can communicate with the HeNB-GW 10.

To allow the HeNB-GW 10 and the MEC server 5 according to this embodiment to use a common UE identifier, one of the procedures described in the first to sixth embodiments may be used. The HeNB-GW 10 and the MEC server 5 may communicate with each other using a common UE identifier in accordance with one of the examples described in the seventh or eighth embodiment.

Figure 11:
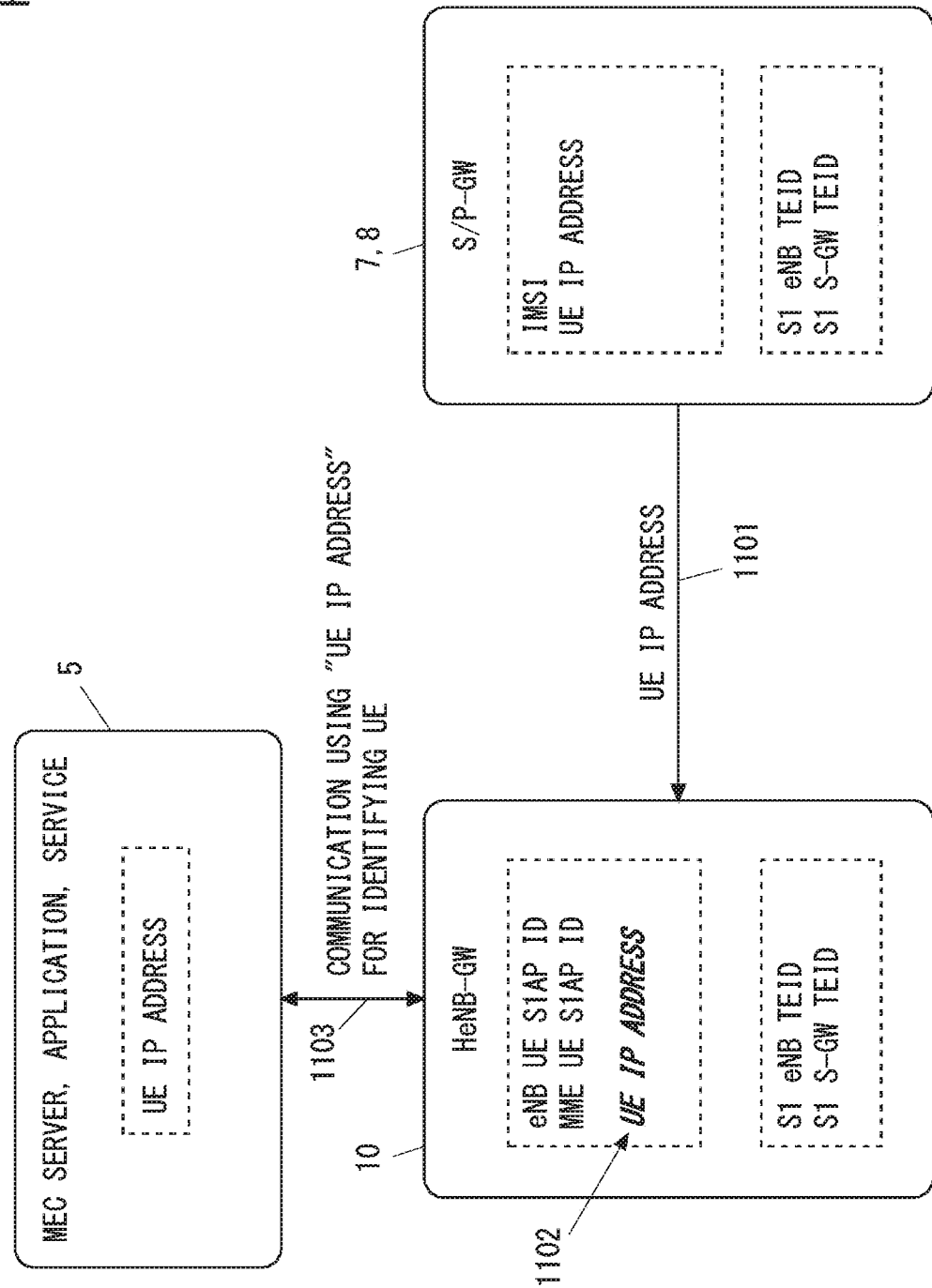
FIG. 11 is a diagram showing one example of operations of an HeNB-GW, an MEC server, and an S/P-GW according to the ninth embodiment.

The following descriptions provide some examples of the procedure for allowing the HeNB-GW 10 and the MEC server 5 to use a common UE identifier. FIG. 11 shows one example of operations of the HeNB-GW 10, the MEC server 5, and the S/P-GW 7 or 8. The S/P-GW 7 or 8 shown in FIG. 11 means the S-GW alone, the P-GW alone, or both the S-GW and the P-GW. The S/P-GW 7 or 8 may be the S/P-GW 7 arranged in the core network 4 or may be the S/P-GW 8 co-located in the location of the HeNB-GW 10 along with the MEC server 5. The S/P-GW 8 may be an S/P-GW virtualized on a platform that is the same as or differs from the MEC server 5.

The example shown in FIG. 11 is similar to the example shown in FIG. 2, except that the HeNB-GW 10 is used in place of the eNodeB 2. That is, in Step 1101, the HeNB-GW 10 receives from the S/P-GW 7 or 8 a first identifier (e.g., an UE IP address) that is used by the MEC server 5 or applications (or services) hosted on the MEC server 5 to identify the UE 1.

In some implementations, the HeNB-GW 10 may receive the first identifier through a user plane tunnel (i.e., S1 bearer) between the S-GW (i.e., the S/P-GW 7 or 8) and the HeNB-GW 10. The HeNB-GW 10 may acquire the first identifier from, for example, a Private Extension information element contained within a GTP-U signalling message received from the S-GW (i.e., the S/P-GW 7 or 8) through the S1 bearer.

In Step 1102, the HeNB-GW 10 associates the first identifier received from the S/P-GW 7 or 8 with a second identifier that is used by the HeNB-GW 10 to identify the UE 1. The second identifier may include one or both of an eNB UE S1AP ID and an S eNB TEID. The second identifier may include a combination of an MME UE S1AP ID and an identifier of the MME (e.g., an MME Code (MMEC), an MME Identifier (MMEI), or a Globally Unique MMEI (GUMMEI)). The second identifier may include a combination of an S1 S-GW TEID and an S-GW identifier.

In Step 1103, the HeNB-GW 10 communicates with the MEC server 5 using the first identifier (e.g., the UE IP address) to specify the UE 1.

In the example shown in FIG. 11, the HeNB-GW 10 acquires the first identifier that is used by the MEC server 5 or applications (or services) hosted on the MEC server 5 to identify the UE 1, and associates the first identifier with the second identifier that is used by the HeNB-GW 10 to identify the UE 1. This allows the HeNB-GW 10 and the MEC server 5 to use a common UE identifier (i.e., the first identifier (e.g., the UE IP address)).

FIG. 12 shows one example of operations of the HeNB-GW 10, the MEC server 5, and the MME 6. The example shown in FIG. 12 is similar to the example shown in FIG. 3, except that the HeNB-GW 10 is used in place of the eNodeB 2. That is, in Step 1201, the HeNB-GW 10 receives a first identifier (e.g., a UE IP address) from the MME 6. In some implementations, the HeNB-GW 10 may receive the first identifier through a signalling interface (i.e., S1-MME interface) between the MME 6 and the eNodeB 2. The HeNB-GW 10 may acquire the first identifier from an existing or new information element contained within an S1AP message received from the MME 6. The HeNB-GW 10 may receive the first identifier from the MME 6 in any procedure that involves signalling with the MME 6 regarding the UE 1, such as an attach procedure or a service request procedure.

In Step 1202, the HeNB-GW 10 associates the first identifier received from the MME 6 with a second identifier that is used by the HeNB-GW 10 to identify the UE 1. The second identifier may include one or both of an eNB UE S1AP ID and an S eNB TEID. The second identifier may include a combination of an MME UE S1AP ID and an identifier of the MME. The second identifier may include a combination of an S1 S-GW TEID and an S-GW identifier.

Step 1203 is similar to Step 1103 shown in FIG. 11.

According to the example shown in FIG. 12, similar to the example shown in FIG. 11, the HeNB-GW 10 and the MEC server 5 are able to use a common UE identifier (i.e., the first identifier (e.g., the UE IP address)).

Figure 13:
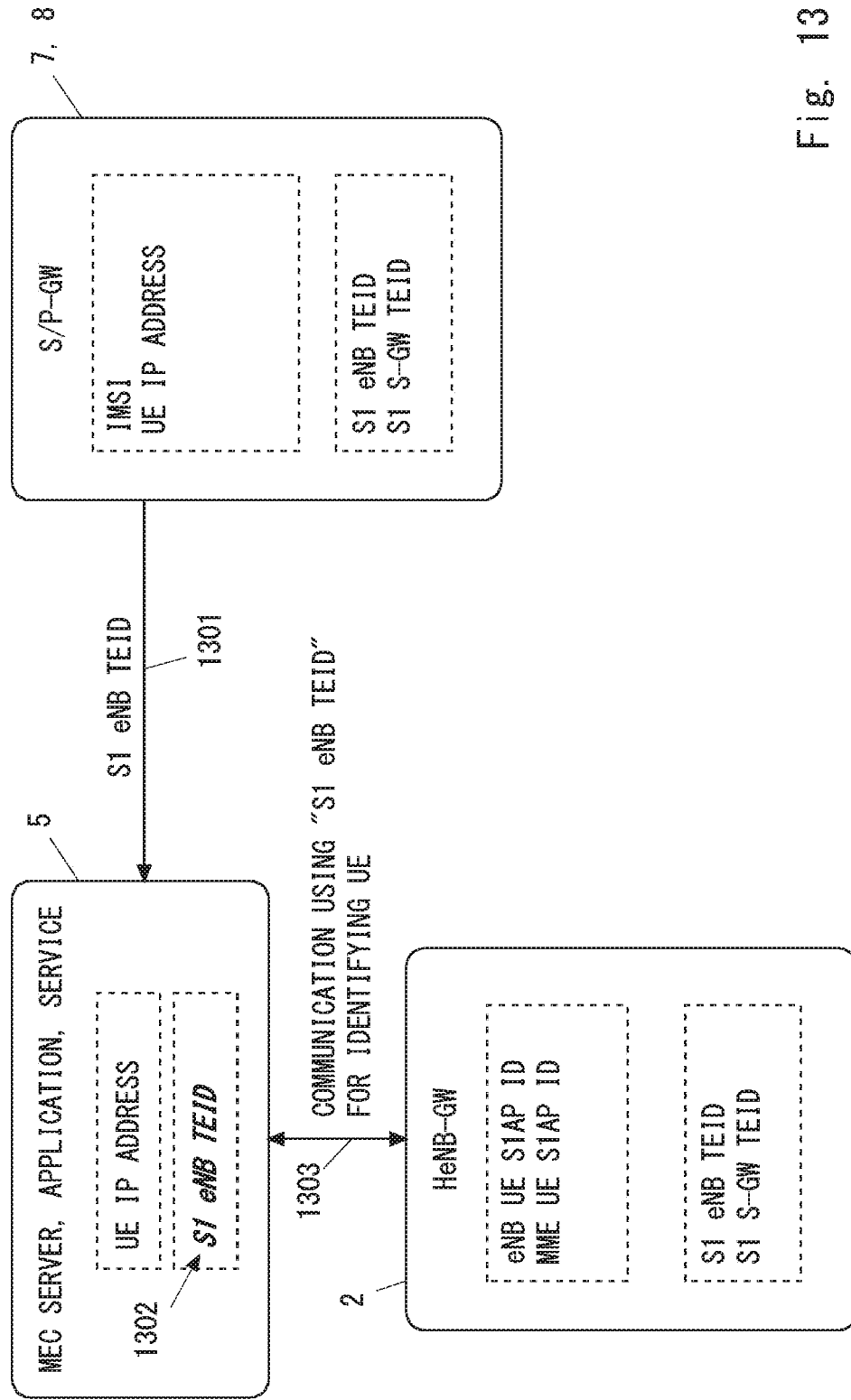
FIG. 13 is a diagram showing one example of operations of the HeNB-GW, the MEC server, and the S/P-GW according to the ninth embodiment.

FIG. 13 shows one example of operations of the HeNB-GW 10, the MEC server 5, and the S/P-GW 7 or 8. The S/P-GW 7 or 8 shown in FIG. 13 means the S-GW alone, the P-GW alone, or both the S-GW and the P-GW. The S/P-GW 7 or 8 may be the S/P-GW 7 arranged in the core network 4 or may be the S/P-GW 8 co-located in the location of the HeNB-GW 10 along with the MEC server 5. The S/P-GW 8 may be an S/P-GW virtualized on a platform that is the same as or differs from the MEC server 5.

The example shown in FIG. 13 is similar to the example shown in FIG. 4, except that the HeNB-GW 10 is used in place of the eNodeB 2. That is, in Step 1301, the MEC server 5 receives from the S/P-GW 7 or 8 a second identifier (e.g., an S1 eNB TEID) that is used by the HeNB-GW 10 to identify the UE 1. The specific example of the second identifier is similar to the example described with reference to FIG. 11. The S/P-GW 7 or 8 manages an S1 eNB TEID and an S1 S-GW TEID to specify an S1 bearer of the UE 1. Accordingly, the second identifier transmitted in Step 1301 may include only the S eNB TEID or a combination of the S eNB TEID and the S1 S-GW TEID. The second identifier transmitted in Step 1301 may include a combination of the S1 S-GW TEID and the S-GW identifier (e.g., the S-GW address).

In Step 1302, the MEC server 5 associates the second identifier received from the S/P-GW 7 or 8 with a first identifier used by the MEC server 5 or applications (or services) hosted on the MEC server 5 to identify the UE 1. The first identifier is, for example, an UE IP address or an application-layer ID (or name) of the UE 1.

In Step 1303, the MEC server 5 communicates with the HeNB-GW 10 using the second identifier (e.g., the S eNB TEID) to identify the UE 1.

According to the example shown in FIG. 13, the HeNB-GW 10 and the MEC server 5 are able to use a common UE identifier (i.e., the second identifier (e.g., the S eNB TEID)).

Figure 14:
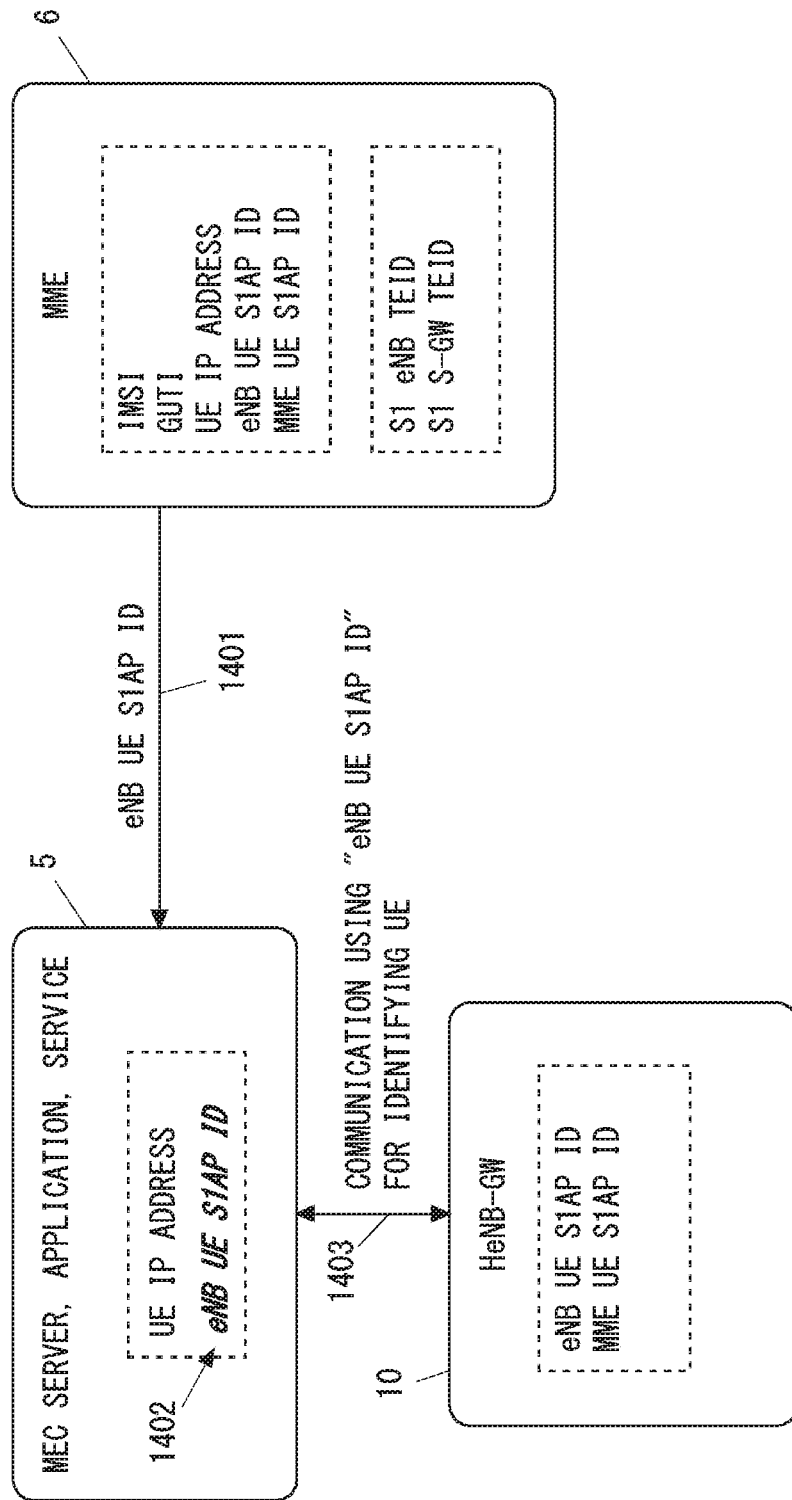
FIG. 14 is a diagram showing one example of operations of the HeNB-GW, the MEC server, and the MME according to the ninth embodiment.

FIG. 14 shows one example of operations of the HeNB-GW 10, the MEC server 5, and the MME 6. The example shown in FIG. 14 is similar to the example shown in FIG. 5, except that the HeNB-GW 10 is used in place of the eNodeB 2. That is, in Step 1401, the MEC server 5 receives from the MME 6 a second identifier (e.g., an eNB UE S1AP ID) that is used by the eNodeB 2 to identify the UE 1. The MME 6 manages an eNodeB UE S1AP ID and an MME UE S1AP ID for the UE 1. These identifiers are managed for the UE 1 also in the HeNB-GW 10. Accordingly, the second identifier transmitted in Step 1401 may be the eNodeB UE S1AP ID, or a combination of the eNodeB UE S1AP ID and the MME UE S1AP ID. The second identifier transmitted in Step 1401 may include a combination of the MME UE S1AP ID and an identifier of the MME (e.g., an MMEC, an MMEI, or a GUMMEI).

Step 1402 is similar to Step 1302 of FIG. 13. That is, in Step 1402, the MEC server 5 associates the second identifier received from the MME 6 with a first identifier that is used by the MEC server 5 or applications (or services) hosted on the MEC server 5 to identify the UE 1. The first identifier is, for example, a UE IP address or an application-layer ID (or name) of the UE 1.

Step 1403 is similar to Step 1303 in FIG. 13. That is, the MEC server 5 communicates with the eNodeB 2 using the second identifier (e.g., the eNB UE S1AP ID) to specify the UE 1.

According to the example shown in FIG. 14, similar to the example shown in FIG. 13, the eNodeB 2 and the MEC server 5 are able to use a common UE identifier (i.e., the second identifier (e.g., the eNB UE S1AP ID)).

Figure 15:
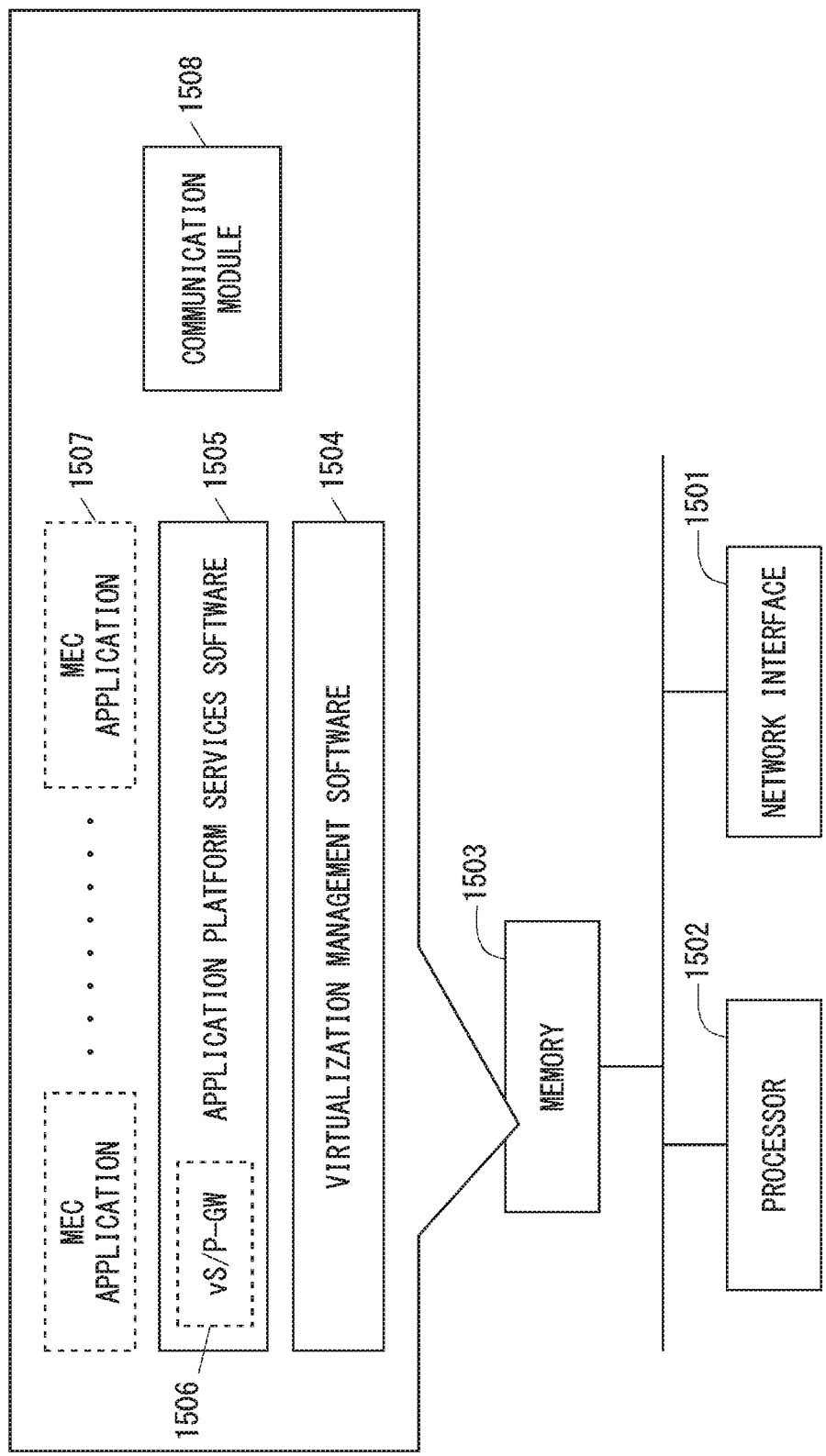
FIG. 15 is a diagram showing a configuration example of an MEC server according to several embodiments.

Lastly, configuration examples of the MEC server 5, the eNodeB 2, and the HeNB-GW 10 according to the above embodiments will be described. FIG. 15 is a block diagram showing a configuration example of the MEC server 5. Referring to FIG. 15, the MEC server 5 includes hardware components including a network interface 1501, a processor 1502, and a memory (or storage) 1503. The network interface 1501 is used to communicate with the eNodeB 2, the HeNB-GW 10, and other network nodes. The network interface 1501 may include, for example, a network interface card (NIC) conforming to the IEEE 802.3 series.

The processor 1502 loads software (computer program) from the memory 1503 and executes the loaded software, thereby performing processing of the MEC server 5 described in the above-described embodiments with reference to the drawings. The processor 1502 may be, for example, a microprocessor, a Micro Processing Unit (MPU), or a Central Processing Unit (CPU). The processor 1502 may include a plurality of processors.

The memory 1503 is composed of a combination of a volatile memory and a nonvolatile memory. The memory 1503 may include a plurality of memory devices that are physically independent from one another. The volatile memory is, for example, a Static Random Access Memory (SRAM), a Dynamic RAM (DRAM) or a combination thereof. The nonvolatile memory is, for example, a mask Read Only Memory (MROM), an Electrically Erasable Programmable ROM (EEPROM), a flash memory, a hard disc drive, or any combination thereof. The memory 1503 may include a storage located apart from the processor 1502. In this case, the processor 1502 may access the memory 1503 via an I/O interface (not shown).

In the example shown in FIG. 15, the memory 1503 is used to store software modules 1504-1507 for MEC and a communication module 1508 for communicating with the eNodeB 2. The virtualization management software 1504 is executed by the processor 1502 to virtualize hardware components including the network interface 1501, the processor 1502, and the memory 1503 and provide Infrastructure as a Service (IaaS) or Platform as a Service (PaaS) facilities, thereby providing a hosting environment for applications.

The application platform services software 1505 is executed by the processor 1502 to provide applications with middleware services such as a communication service, a radio network information service, and a traffic offload function.

The application platform services software 1505 may include a virtualized S/P-GW software module 1506. The virtualized S/P-GW software module 1506 uses the hosting environment provided by the virtualization management software 1504, and provides functions of S-GW or P-GW or both.

The one or more applications 1507 are MEC applications hosted on the MEC server 5. The one or more applications 1507 communicate with the UE 1 using communication services provided by the application platform services software 1505 or the communication module 1508.

The communication module 1508 is executed by the processor 1502 and provides the MEC application 1507 with communication services for communicating with the RAN node (e.g., the eNodeB 2 or the HeNB-GW 10) according to the above-described embodiments. In some implementations, the communication module 1508 may be included in the application platform services software 1505.

Figure 16:
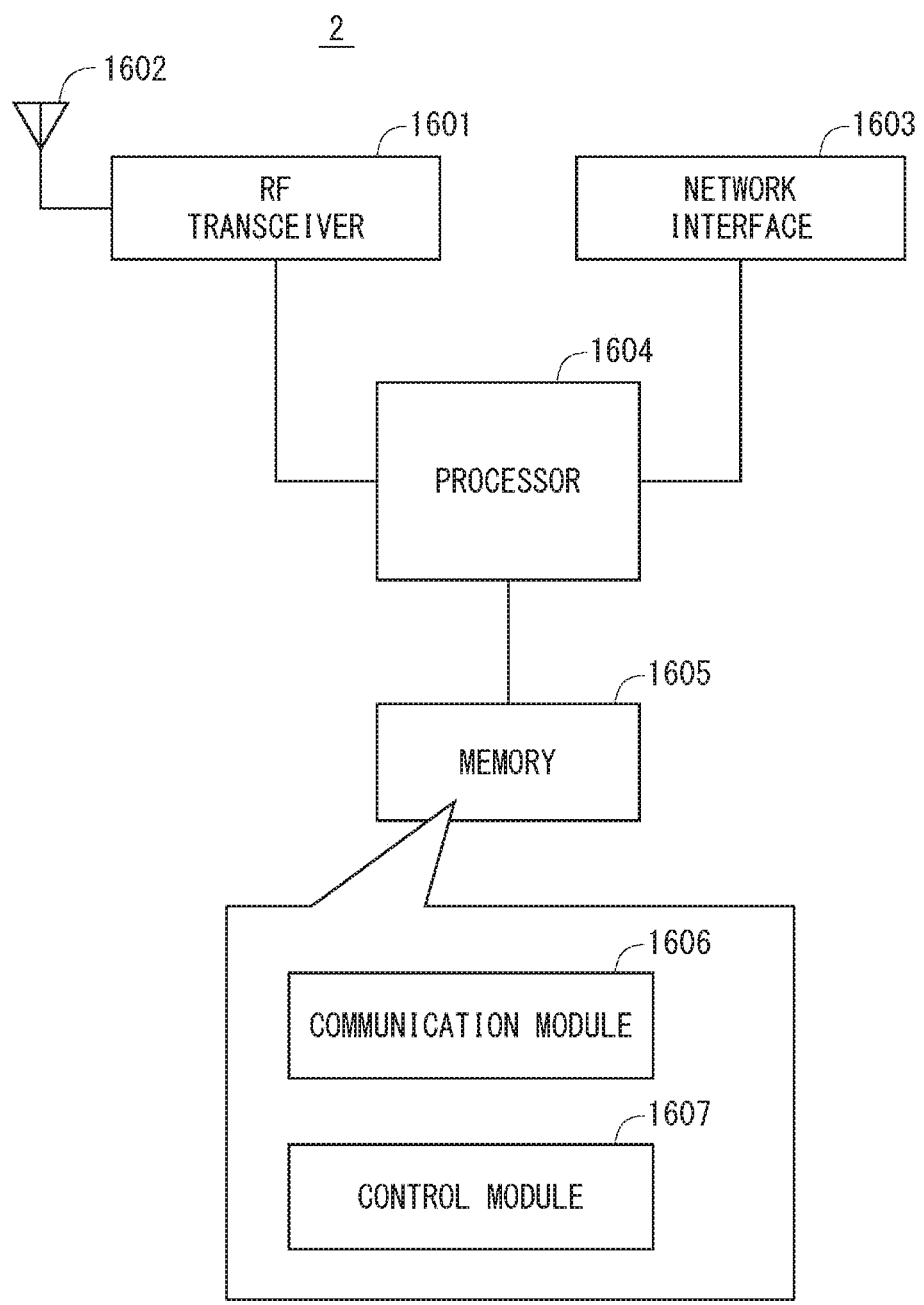
FIG. 16 is a diagram showing a configuration example of an eNodeB according to the several embodiments.

FIG. 16 is a block diagram showing a configuration example of the eNodeB 2 according to the above-described embodiments. Referring to FIG. 16, the eNodeB 2 includes an RF transceiver 1601, a network interface 1603, a processor 1604, and a memory 1605. The RF transceiver 1601 performs analog RF signal processing to communicate with the UE 1. The RF transceiver 1601 may include a plurality of transceivers. The RF transceiver 1601 is coupled to an antenna 1602 and the processor 1604. In some implementations, the RF transceiver 1601 receives modulated symbol data (or OFDM symbol data) from the processor 1604, generates a transmission RF signal, and supplies the transmission RF signal to the antenna 1602. Further, the RF transceiver 1601 generates a baseband reception signal based on a reception RF signal received by the antenna 1602, and supplies the baseband reception signal to the processor 1604. As described above, the eNodeB 2 may be a BBU (or REC) used in the C-RAN architecture. In this case, the eNodeB 2 may not include the RF transceiver 1601.

The network interface 1603 is used to communicate with network nodes (e.g., the MME 6 and the S/P-GW 7) and the MEC server 5. The network interface 1603 may include, for example, a network interface card (NIC) conforming to the IEEE 802.3 series.

The processor 1604 performs digital baseband signal processing (i.e., data-plane processing) and control-plane processing for radio communication. In the case of LTE and LTE-Advanced, for example, the digital baseband signal processing performed by the processor 1604 may include signal processing of a PDCP layer, an RLC layer, a MAC layer, and a PHY layer. Further, the control-plane processing by the processor 1604 may include processing of the S1 protocol, the RRC protocol, and the MAC CEs.

The processor 1604 may include a plurality of processors. The processor 1604 may include, for example, a modem processor (e.g., a DSP) that performs the digital baseband signal processing and a protocol stack processor (e.g., a CPU or an MPU) that performs the control-plane processing.

The memory 1605 is composed of a combination of a volatile memory and a nonvolatile memory. The volatile memory is, for example, an SRAM, a DRAM, or a combination thereof. The non-volatile memory is, for example, an MROM, a PROM, a flash memory, a hard disc drive, or any combination thereof. The memory 1605 may include a storage located apart from the processor 1604. In this case, the processor 1604 may access the memory 1605 via the network interface 1603 or an I/O interface (not shown).

The memory 1605 may store software modules (computer programs) including instructions and data to perform the processing of the eNodeB 2 described in the above embodiments. In some implementations, the processor 1604 may be configured to load the software modules from the memory 1605 and execute the loaded software module, thereby performing the processing of the eNodeB 2 described in the above embodiments with reference to the drawings.

In the example shown in FIG. 16, the memory 1605 stores a communication module 1606 and a control module 1607. The processor 1604 loads and executes the communication module 1606, to perform communication with the MEC server 5. The processor 1604 loads and executes the control module 160 to perform a radio resource management for the UE 1.

Figure 17:
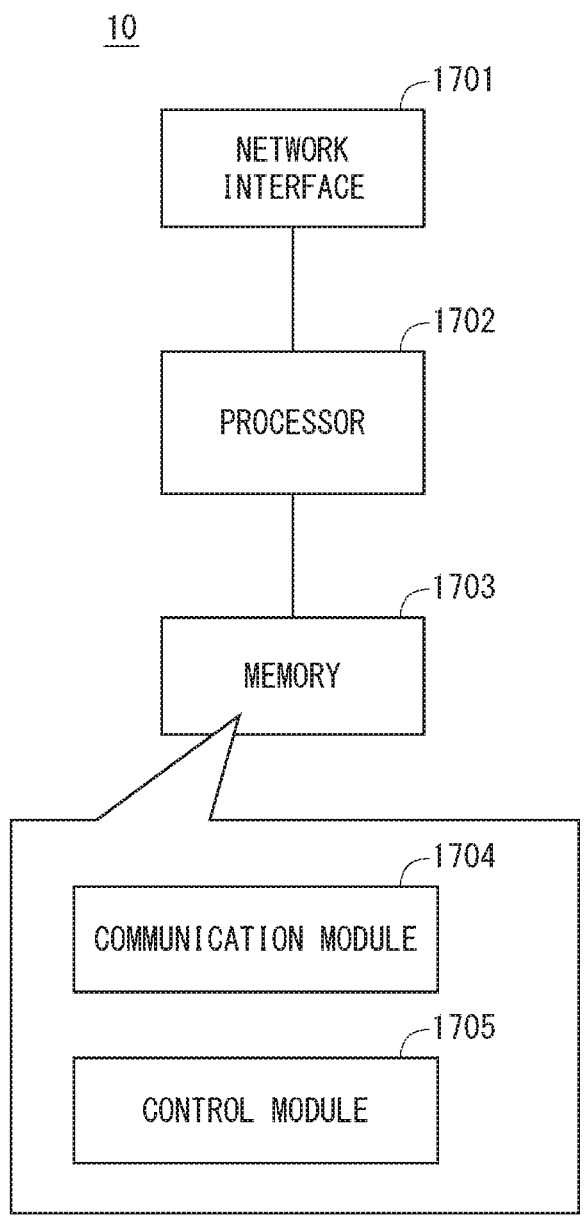
FIG. 17 is a diagram showing a configuration example of the HeNB-GW according the ninth embodiment.

FIG. 17 is a block diagram showing a configuration example of the HeNB-GW 10. Referring to FIG. 17, the HeNB-GW 10 includes a network interface 1701, a processor 1702, and a memory 1703. The network interface 1701 is used to communicate with one or more network nodes (e.g., the (H)eNB 11, the MME 6, the S/P-GW 7, and the MEC server 5). The network interface 1701 may include, for example, a network interface card (NIC) conforming to the IEEE 802.3 series.

The processor 1702 loads software (computer programs) from the memory 1703 and executes the loaded software, thereby performing the processing of the HeNB-GW 10 described in the above embodiments. The processor 1702 may be, for example, a microprocessor, an MPU, or a CPU. The processor 1702 may include a plurality of processors.

The memory 1703 is composed of a combination of a volatile memory and a nonvolatile memory. The memory 1703 may include a storage located apart from the processor 1702. In this case, the processor 1702 may access the memory 1703 via an I/O interface (not shown).

In the example shown in FIG. 17, the memory 1703 stores a communication module 1704 and a control module 1705. The processor 1702 loads and executes the communication module 1704 to perform communication with the MEC server 5. The processor 1702 loads and executes the control module 1705 to provide the functions of the HeNB-GW. The functions of the HeNB-GW include providing an S1-MME interface or S1-MME and S1-U interfaces. To be more specific, the functions of the HeNB-GW includes relaying UE-associated S1AP messages between the MME 6 and the HeNB 11, and terminating non-UE associated S1AP messages directed to the HeNB 11 or the MME 6. The functions of the HeNB-GW may include terminating the S1-U interface with the S/P-GW 7 (or the virtualized S/P-GW 8) and terminating the S1-U interface with the HeNB 11.

As described above with reference to FIGS. 15 to 17, each of the processors included in the MEC server 5, the eNodeB 2, and the HeNB-GW 10 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

The first to ninth embodiments provide the example in which the MEC server 5 is coupled to the eNodeB 2 or HeNB-GW 10 which serves as the RAN node. Instead, the MEC server 5 may be coupled to another RAN node. The MEC server 5 may be coupled to an X2 Gateway (X2-GW). Alternatively, the MEC server 5 may be coupled to an integrated RAN node that has both the above-described functions of the HeNB-GW 10 and the functions of the X2-GW. The X2-GW is arranged between two eNodeBs and relays control plane signals (i.e., X2AP messages) between the two eNodeBs. The X2-GW may further relay user plane data between the two eNodeBs.

In some implementations, the X2-GW (or the integrated RAN node) may associate the first identifier (e.g., the UE IP address) received from the S/P-GW 7 or 8 with the second identifier (e.g., the eNB UE X2AP ID) that is used by the X2-GW (or the integrated RAN node) to identify the UE 1. Alternatively, the X2-GW (or the integrated RAN node) may associate the first identifier (e.g., the UE IP address) received from the MME 6 with the second identifier (e.g., the eNB UE X2AP ID) that is used by the X2-GW (or the integrated RAN node) to identify the UE 1. Alternatively, the MEC server 5 may associate the second identifier (e.g., the eNB UE X2AP ID) received from the S/P-GW 7 or 8 with the first identifier (e.g., the UE IP address) that is used 1 by the MEC server 5 or applications (or services) hosted on the MEC server 5 to identify the UE. Alternatively, the MEC server 5 may associate the second identifier (e.g., the eNB UE X2AP ID) received from the MME 6 with the first identifier (e.g., the UE IP address) that is used by the MEC server 5 or applications (or services) hosted on the MEC server 5 to identify the UE 1.

As already described above, the above embodiments may be applied to a mobile communication network other than LTE and LTE-Advanced. When the above embodiments are applied to 3GPP UMTS, the MEC server 5 may be arranged in such a way that it can directly communicate with an RNC which serves as a RAN node or a radio base station. In some implementations, the MEC server 5 may be physically integrated with the RNC. In some implementations, the MEC server 5 may be installed in the same building (or site) as the RNC, and may be connected to a LAN in this site in such a way that the MEC server 5 can communicate with the RNC. The above embodiments may be applied to communication networks of enhancements (e.g., 3GPP LTE-Advanced Pro, LTE+, or enhanced LTE (eLTE)) of the current LTE and LTE-Advanced. In this case, the eNodeB 2 may be a base station of 3GPP LTE-Advanced Pro, LTE+, or enhanced LTE (eLTE). Further, the eNodeB 2 may be a base station that provides a new 5G air interface (new Radio Access Technology (RAT)) which will be standardized in 3GPP Release 14.

Further, the embodiments described above are merely examples of applications of the technical ideas obtained by the present inventors. These technical ideas are not limited to the above-described embodiments and various modifications can be made thereto.

This application is based upon and claims the benefit of priority from Japanese Patent Application No. 2015-242686, filed on Dec. 11, 2015, the disclosure of which is incorporated herein in its entirety by reference.

REFERENCE SIGNS LIST

1 UE
2 eNodeB
3 RADIO ACCESS NETWORK
4 CORE NETWORK
5 MEC SERVER
6 MME
7 S/P-GW
10 HeNB-GW
11 HeNB
1505 APPLICATION PLATFORM SERVICES SOFTWARE
1508 COMMUNICATION MODULE
1606 COMMUNICATION MODULE
1607 CONTROL MODULE
1704 COMMUNICATION MODULE
1705 CONTROL MODULE

The invention claimed is:

1. A method performed by a radio base station, the method comprising:
  receiving a Tunnel Endpoint Identifier (TEID) of a User Equipment (UE) from a core network node;
  associating an Internet Protocol (IP) address of the UE with the TEID of the UE; and
  in response to receiving a request message containing the IP address of the UE from a Mobile Edge Computing (MEC) server different from the core network node, transmitting to the MEC_server a response message containing radio access bearer information of the UE, wherein the radio access bearer information comprises information on a Quality of Service Class Identifier (QCI) of the UE.

2. The method of claim 1, wherein the radio access bearer information further comprises information on a Quality of Service (QoS) of the UE.

3. The method of claim 1, wherein the radio base station is arranged in a radio access network.

4. A method performed by a Mobile Edge Computing (MEC) server, the method comprising:
  sending a request message containing an Internet Protocol (IP) address of a User Equipment (UE) to a radio base station; and
  receiving from the radio base station a response message containing radio access bearer information of the UE, wherein
    the IP address of the UE is associated with a Tunnel Endpoint Identifier (TEID) of the UE by the radio base station, and
    the radio access bearer information comprises information on a Quality of Service Class Identifier (QCI) of the UE, and wherein the TED of the UE is received by the radio base station from a core network node different from the MEC server.

5. The method of claim 4, wherein the radio access bearer information further comprises information on a Quality of Service (QoS) of the UE.

6. The method of claim 4, wherein the radio base station is arranged in a radio access network.

7. A radio base station comprising:
  a controller configured to receive a Tunnel Endpoint Identifier (TED) of a User Equipment (UE) from a core network node and associate an Internet Protocol (IP) address of the UE with the TED of the UE; and a transceiver configured to, in response to receiving a request message containing the IP address of the UE from a Mobile Edge Computing (MEC) server different from the core network node, transmit to the MEC server a response message containing a radio access bearer information of the UE, wherein the radio access bearer information comprises information on a Quality of Service Class Identifier (QCI) of the UE.

8. The radio base station of claim 7, wherein the radio access bearer information further comprises information on a Quality of Service (QoS) of the UE.

9. The radio base station of claim 7, wherein the radio base station is arranged in a radio access network.

* * * * *